US007860390B2

(12) United States Patent
Iwabuchi

(10) Patent No.: US 7,860,390 B2
(45) Date of Patent: Dec. 28, 2010

(54) IMAGING ELEMENT PACKAGE, IMAGING ELEMENT MODULE AND LENS BARREL, AND IMAGE CAPTURING APPARATUS

(75) Inventor: Kaoru Iwabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 372 days.

(21) Appl. No.: 12/071,328

(22) Filed: Feb. 20, 2008

(65) Prior Publication Data
US 2008/0292308 A1 Nov. 27, 2008

(30) Foreign Application Priority Data
Feb. 26, 2007 (JP) .............................. 2007-045533
Dec. 5, 2007 (JP) .............................. 2007-314724

(51) Int. Cl.
*G03B 17/02* (2006.01)
(52) U.S. Cl. ...................................... 396/535
(58) Field of Classification Search .................. 396/535
See application file for complete search history.

(56) References Cited

U.S. PATENT DOCUMENTS

| 5,866,948 | A * | 2/1999 | Murakami et al. | ........... 257/778 |
| 2008/0075456 | A1* | 3/2008 | Webster et al. | .............. 396/535 |
| 2008/0095528 | A1* | 4/2008 | Jao et al. | ..................... 396/458 |

FOREIGN PATENT DOCUMENTS

| JP | 09-069984 A | 3/1997 |
| JP | 09-083736 A | 3/1997 |
| JP | 2001-257330 A | 9/2001 |
| JP | 2005-124099 A | 5/2005 |
| JP | 2005-157290 A | 6/2005 |
| JP | 2007-006475 A | 1/2007 |
| JP | 2007-043063 A | 2/2007 |
| JP | 2007-047590 A | 2/2007 |

OTHER PUBLICATIONS

JPO Office Action, App. No. JP2007-314724, Feb. 3, 2009 (2 pages).
Japanese Office Action issued May 19, 2009 for corresponding Japanese Application No. 2007-314724.

* cited by examiner

*Primary Examiner*—Clayton E Laballe
*Assistant Examiner*—Bret Adams
(74) *Attorney, Agent, or Firm*—Rader, Fishman & Grauer PLLC

(57) ABSTRACT

An imaging element package includes: an imaging element chip having an imaging surface; a substrate on which the imaging element chip is mounted; an optical member that allows light to pass; and a supporting body having a body portion where a through-opening serving as a light path for imaging is formed, and an attachment portion that is provided in the body portion and is to be attached to an attachment position. The substrate is attached to the body portion so as to close one end of the opening in a through direction in a state where the imaging surface faces another end from the one end of the opening in the through direction, and the optical member is attached to the body portion so as to close the other end of the opening in the through direction.

20 Claims, 20 Drawing Sheets

FIG. 9
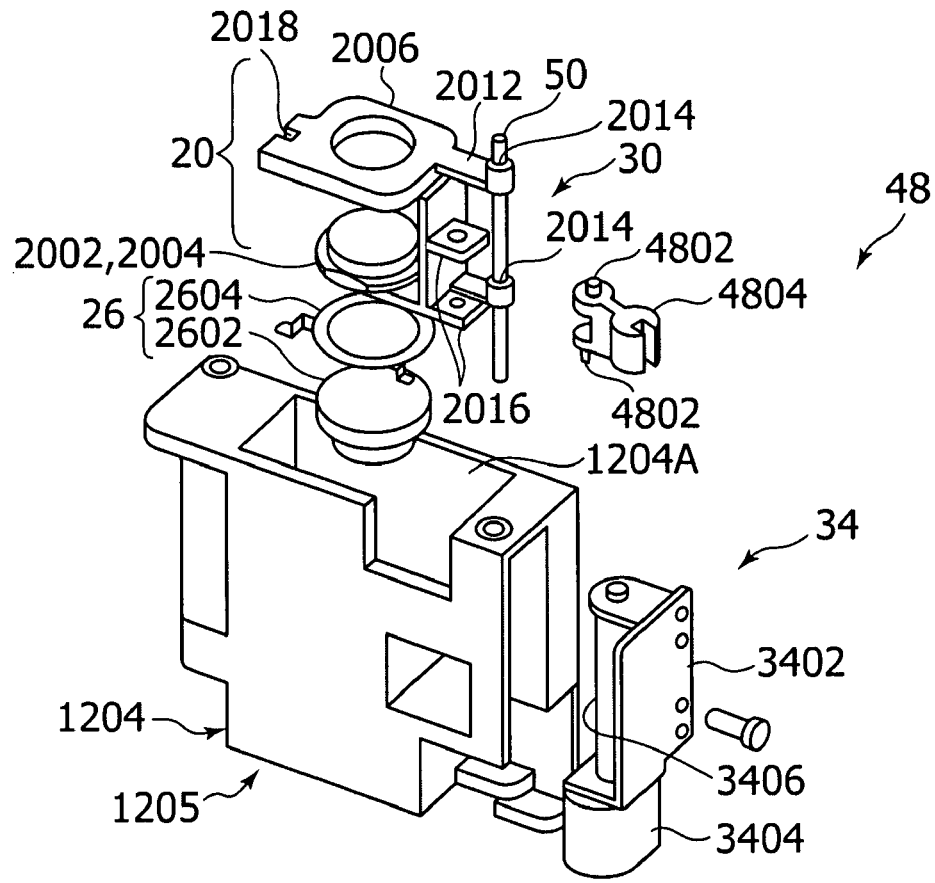
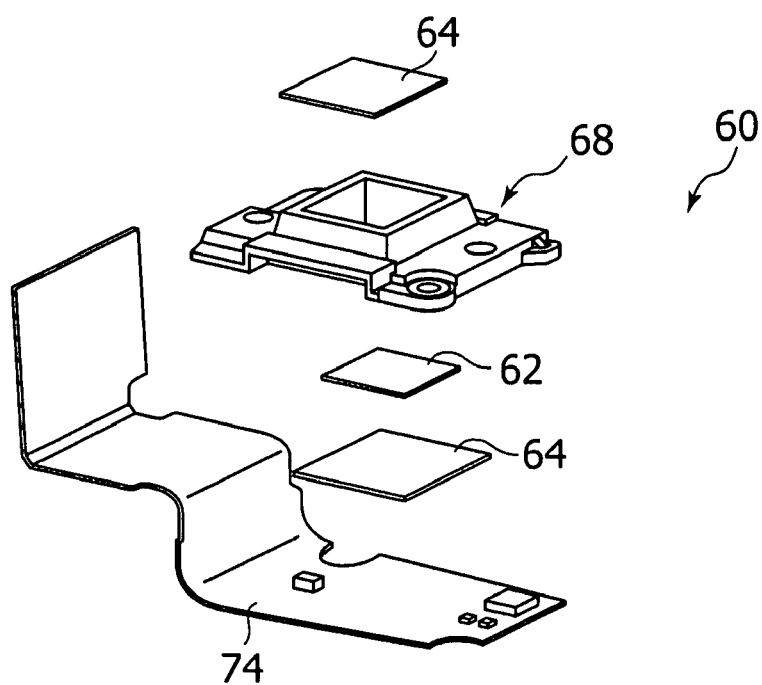

FIG. 19
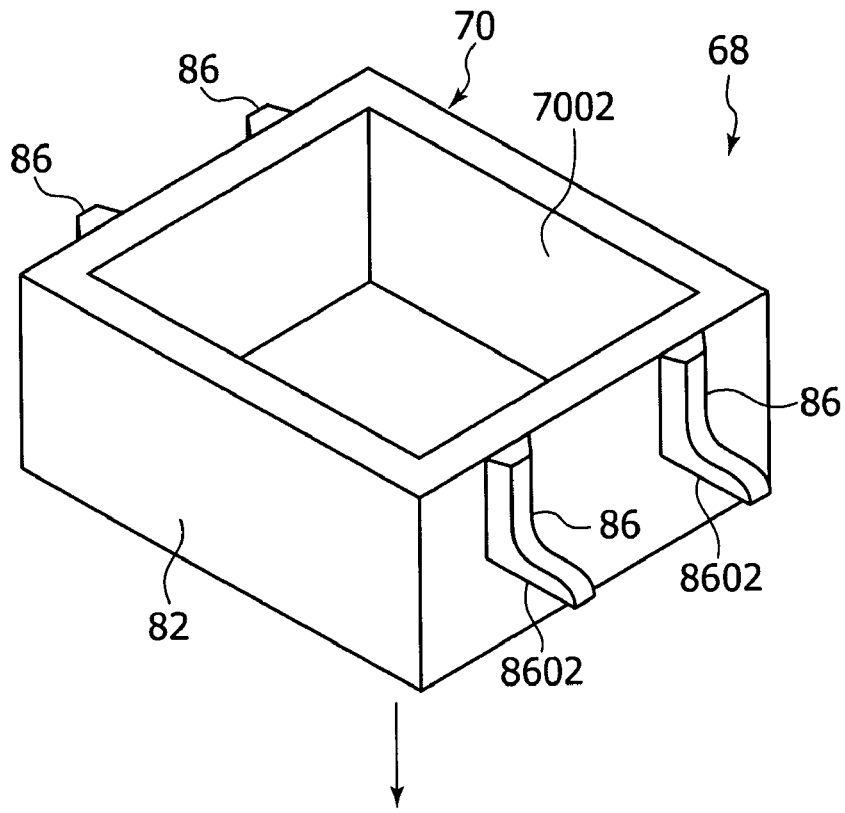
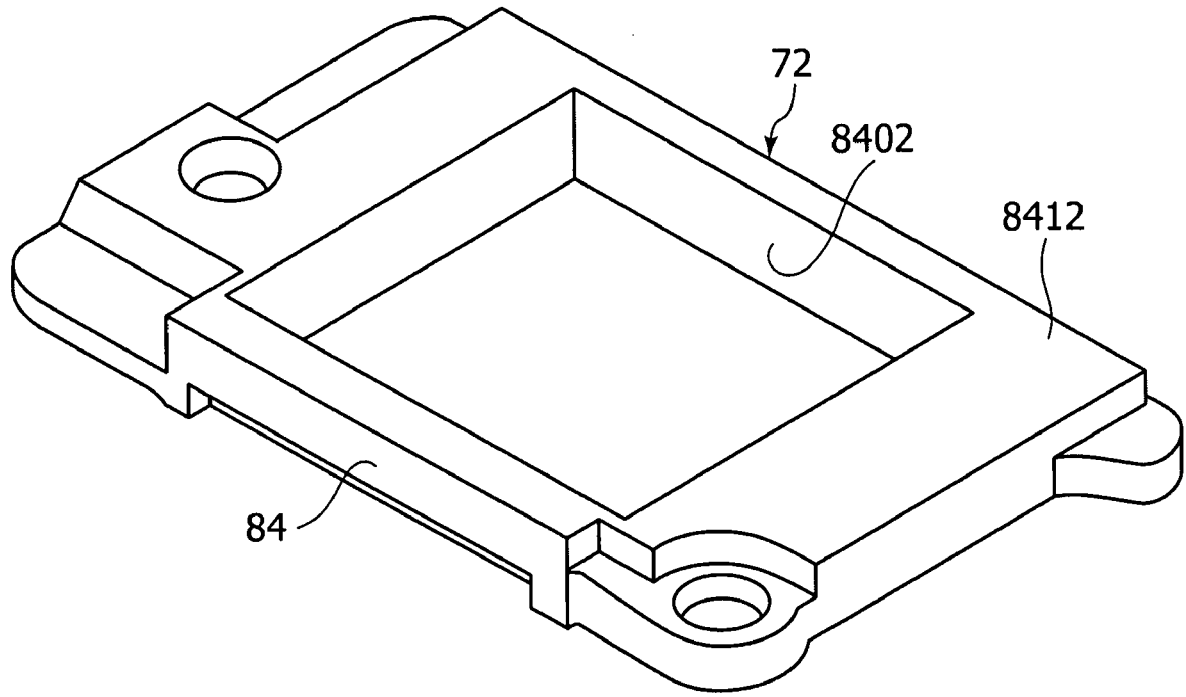

IMAGING ELEMENT PACKAGE, IMAGING ELEMENT MODULE AND LENS BARREL, AND IMAGE CAPTURING APPARATUS

BACKGROUND OF THE INVENTION

1. Field of the Invention

The present invention relates to an imaging element package, an imaging element module and a lens barrel, and an image capturing apparatus.

2. Description of Related Art

In related art, an imaging element unit having an imaging element chip or imager chip built therein has been provided.

The imaging element unit has a structure as follows. An imaging element chip is placed in a depressed accommodation portion of a package, and the depressed accommodation portion is sealed by a seal glass, thereby forming an imaging element portion. The imaging element portion is mounted on a flexible substrate, which is a wiring member. Then, the imaging element portion is assembled to a holder, and a sealing rubber and an optical member are placed on the seal glass in the order of mention, and further the seal glass fixes to the holder by a pressing member to thereby seal a space between the seal glass and the optical element (refer to Japanese Patent Application Publication 2005-124099).

SUMMARY OF THE INVENTION

As stated above, in the related art imaging element unit, the imaging element chip is sealed by the seal glass and the package, and the space between the seal glass and the optical element is sealed by the optical member, the seal rubber and the seal glass, and so on. However, its structure leaves room for improvement. Thus, it is disadvantageous in reducing the number of parts, making it difficult to improve assembling work. Furthermore, it is disadvantageous in downsizing.

Accordingly, it is desirable to provide an imaging element package, an imaging element module and a lens barrel, and an image capturing apparatus, which can reduce the cost and benefit the downsizing. The present invention is made in light of the above-described situation.

According to an embodiment of the present invention, an imaging element package includes; an imaging element chip having an imaging surface; a substrate on which the imaging element chip is mounted; an optical member that allows light to pass; and a supporting body having a body portion where a through-opening serving as a light path for imaging is formed, and an attachment portion that is provided in the body portion and is to be attached to an attachment position. The substrate is attached to the body portion so as to close one end of the opening in a through direction in a state where the imaging surface faces another end from the one end of the opening in the through direction. The optical member is attached to the body portion so as to close the other end of the opening in the through direction.

Moreover, according to another embodiment of the present invention, there is provided an imaging element module including an imaging element package and a wiring member. The imaging element package includes; an imaging element chip having an imaging surface; a substrate on which the imaging element chip is mounted; an optical member that allows light to pass; and a supporting body having a body portion where a through-opening serving as a light path for imaging is formed, and an attachment portion that is provided in the body portion and is to be attached to an attachment position. The substrate is attached to the body portion so as to close one end of the opening in a through direction in a state where the imaging surface faces another end from the one end of the opening in the through direction. The optical member is attached to the body portion so as to close the other end of the opening in the through direction. The substrate is electrically connected to the wiring member.

Moreover, according to another embodiment of the present invention, there is provided a lens barrel including a barrel and an imaging element module, the imaging element module including an imaging element package and a wiring member. The imaging element package includes; an imaging element chip having an imaging surface; a substrate on which the imaging element chip is mounted; an optical member that allows light to pass; and a supporting body having a body portion where a through-opening serving as a light path for imaging is formed, and an attachment portion that is provided in the body portion and is to be attached to an attachment position. The substrate is attached to the body portion so as to close one end of the opening in a through direction in a state where the imaging surface faces another end from the one end of the opening in the through direction. The optical member is attached to the body portion so as to close the other end of the opening in the through direction. The substrate is electrically connected to the wiring member. The attachment portion is attached to the barrel such that the optical member faces the inside of the barrel.

Furthermore, according to another embodiment of the present invention, there is provided an image capturing apparatus having a lens barrel, the lens barrel having a barrel and an imaging element module, and the imaging element module including an imaging element package and a wiring member. The imaging element package includes; an imaging element chip having an imaging surface; a substrate on which the imaging element chip is mounted; an optical member that allows light to pass; and a supporting body having a body portion where a through-opening serving as a light path for imaging is formed, and an attachment portion that is provided in the body portion and is to be attached to an attachment position. The substrate is attached to the body portion so as to close one end of the opening in a through direction in a state where the imaging surface faces another end from the one end of the opening in the through direction. The optical member is attached to the body portion so as to close the other end of the opening in the through direction. The substrate is electrically connected to the wiring member. The attachment portion is attached to the barrel such that the optical member faces the inside of the barrel.

According to the present invention, the art seal glass and seal rubber used in the related art for sealing the imaging element chip are not required anymore, and the space between the seal glass and the optical member can be omitted, thereby providing an advantageous construction that allows cost reductions for the parts and assembly work as well as downsizing.

BRIEF DESCRIPTION OF THE DRAWINGS

FIG. 9 is an exploded perspective view showing a configuration of the rest of the lens barrel 10;

FIG. 19 is an exploded perspective view of a supporting body 68 of the second embodiment;

DETAILED DESCRIPTION OF EMBODIMENTS

Figure 1:
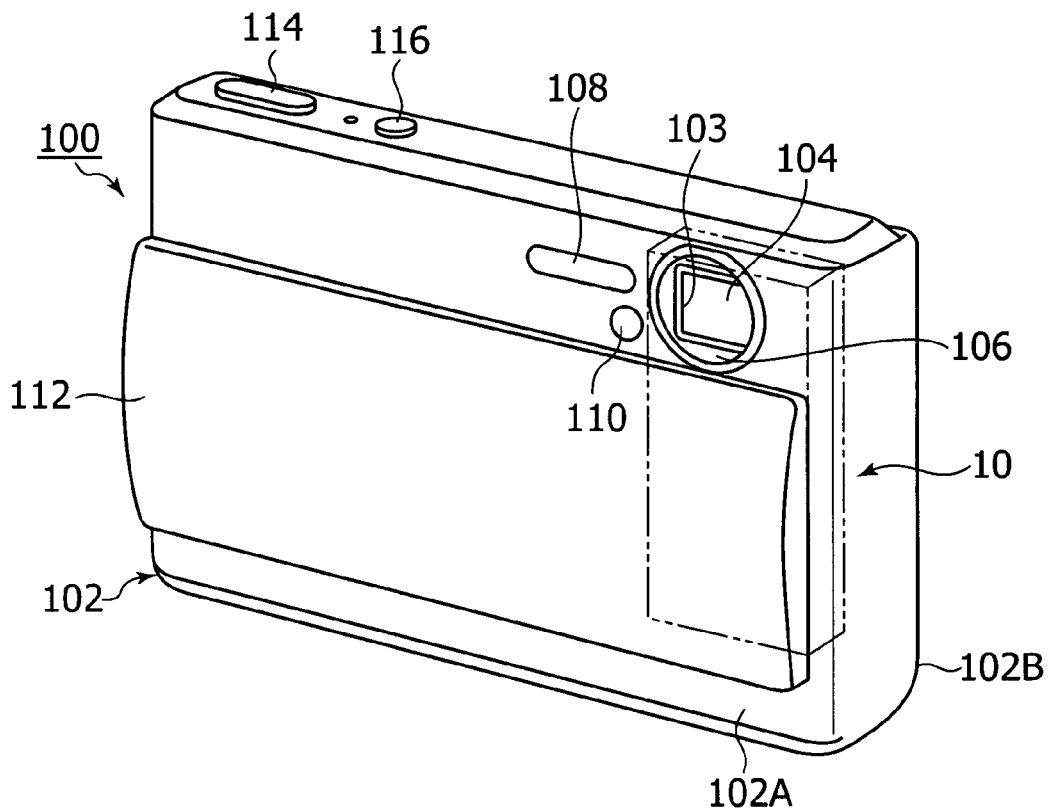
FIG. 1 is a perspective view when an image capturing apparatus 100 of the first embodiment is viewed from the front side.

Referring to the drawings, embodiments of the present invention are described below.

First Embodiment

In the present embodiment, a case where an imaging element package, an imaging element module, and a lens barrel according to the present invention are built into an image capturing apparatus is described.

Figure 2:
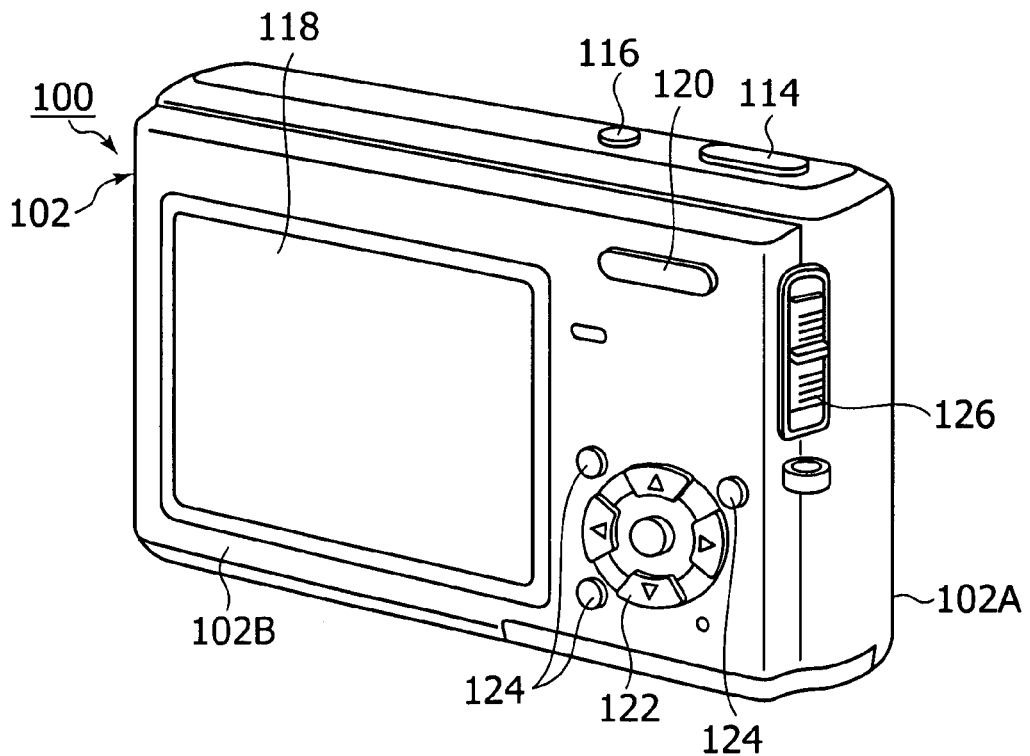
FIG. 2 is a perspective view when the image capturing apparatus 100 of the first embodiment is viewed from the rear side.
Figure 3:
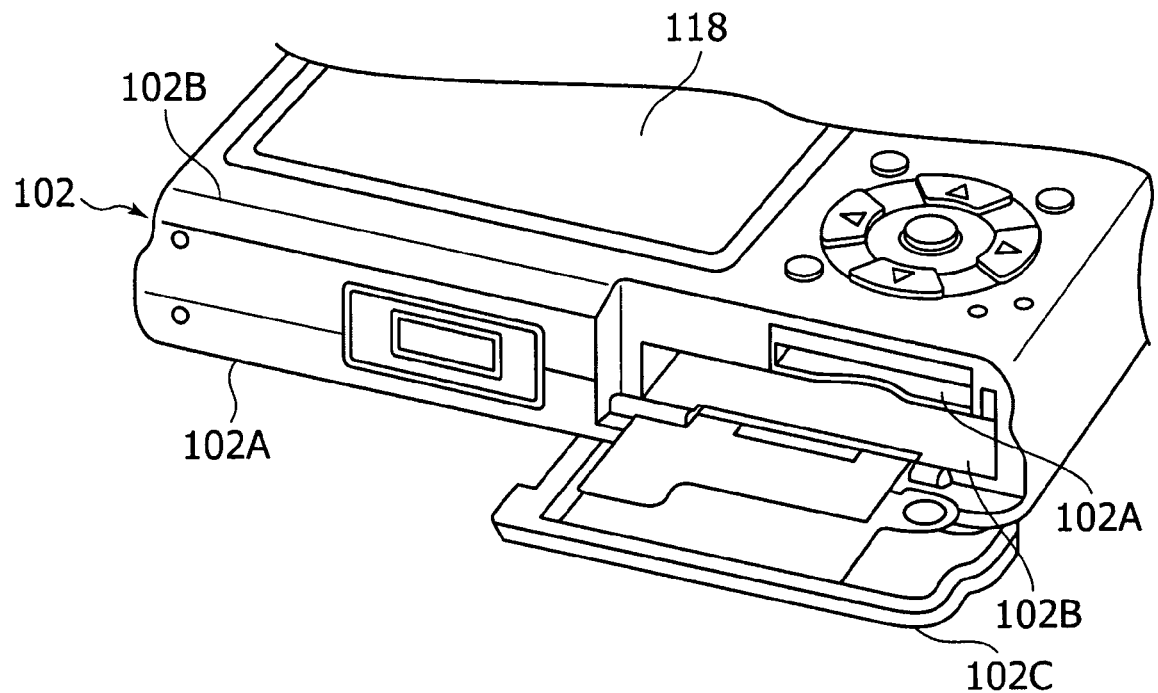
FIG. 3 is a perspective view when the image capturing apparatus 100 of the first embodiment is viewed from the bottom side.
Figure 4:
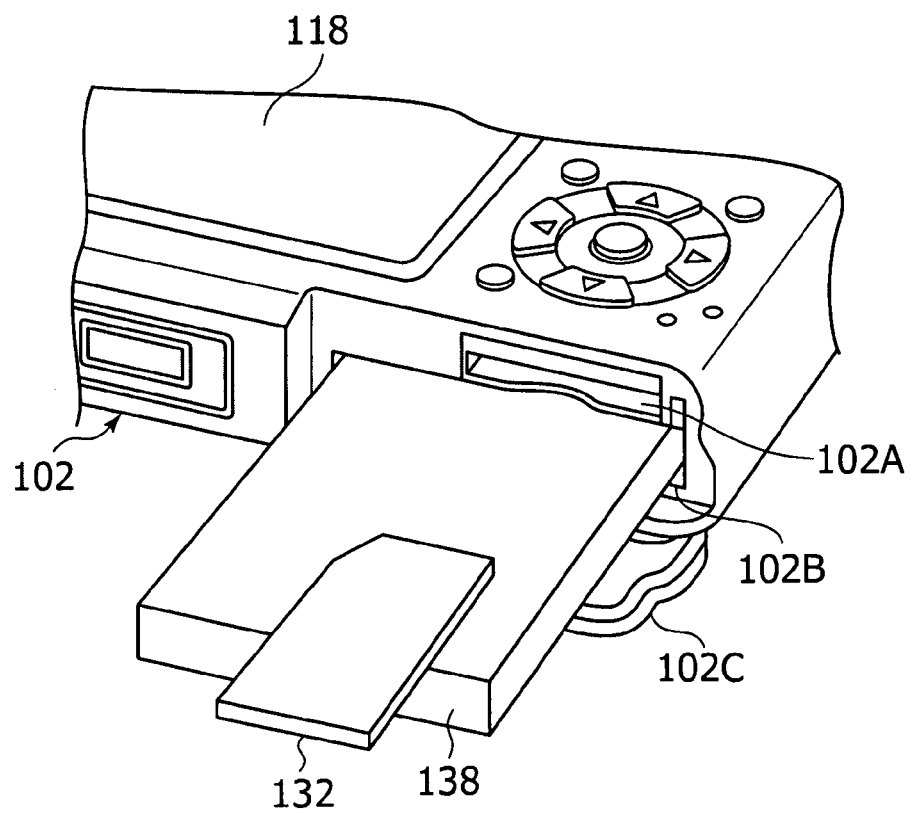
FIG. 4 is an explanatory view for explaining a housing state of a memory card 132 and a battery 138.
Figure 5:
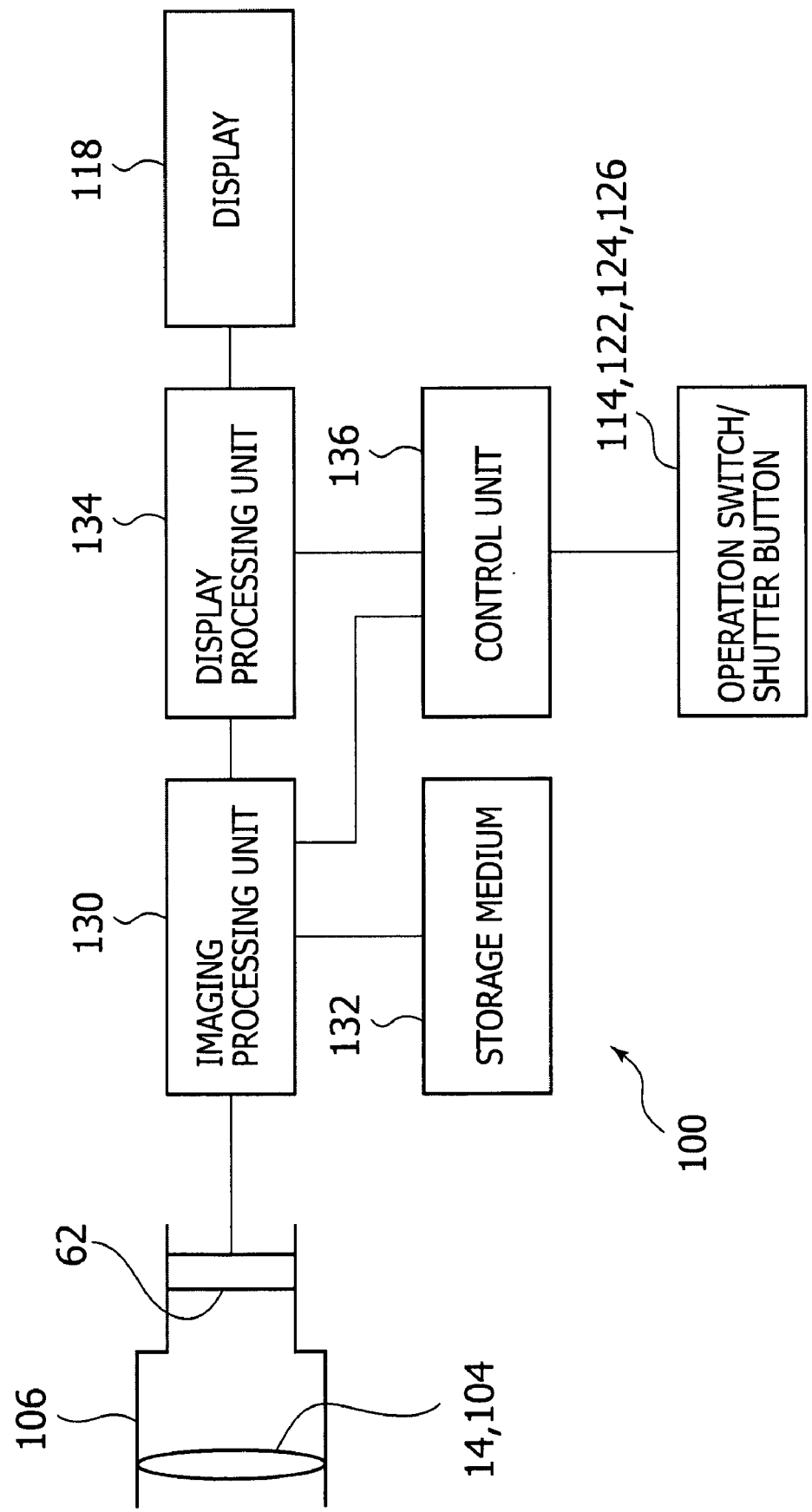
FIG. 5 is a block diagram showing a control system of the image capturing apparatus 100.

FIG. 1 is a perspective view when an image capturing apparatus 100 of the present embodiment is viewed from the front side; FIG. 2 is a perspective view when the image capturing apparatus 100 of the present embodiment is viewed from the rear side; FIG. 3 is a perspective view when the image capturing apparatus 100 of the present embodiment is viewed from the bottom side; FIG. 4 is an explanatory view for explaining a housing state of a memory card 132 and a battery 138; and FIG. 5 is a block diagram showing a control system of the image capturing apparatus 100.

As shown in FIGS. 1 and 2, the image capturing apparatus 100 is a digital still camera.

The image capturing apparatus 100 has a rectangular plate-like casing 102 making up armoring, and the casing 102 is constructed by superimposing a front casing 102A and a rear casing 102B.

The front surface of the casing 102 is made of the front casing 102A, and the rear surface of the casing 102 is made of the rear casing 102B.

In the present specification, the front denotes the subject side, the rear is its opposite side, and the right and left denote directions when the image capturing apparatus 100 is viewed from the front side.

A lens barrel 10 is built into a right portion of the casing 102, as indicated by an alternate long and two dashes line in the figure, and the lens barrel 10 is provided with an objective lens 14, an imaging element package 60 according to the present embodiment (refer to FIG. 6), an optical system 104 that guides a subject image captured by the objective lens 14 to the imaging element package 60, and the like. The imaging element package 60 includes an imaging element chip 62 (refer to FIG. 5), which is described later.

The objective lens 14 is arranged so as to face the front side of the casing 102 through a lens window 103 provided in the front casing 102A.

In a right portion of the front surface of the casing 102, a flash light 108 that provides auxiliary lighting for photographing, a self-timer lamp 110, and the like are provided.

A cover 112 is provided in the front surface of the casing 102 and allowed to slide in the vertical direction. This cover 12 is slid between a lower limit position where the lens window 103, the flash 108, and the self-timer lamp 110 are exposed forward and an upper limit position where the lens window 103, the flash 108, and the self-timer lamp 110 are covered.

In a left portion of an upper surface of the casing 102, a shutter button 114, a power supply button 116 and the like are provided.

In the rear surface of the casing 102, a display (liquid crystal display) 118 for displaying an image, such as a still image and a moving image, letters, and symbols, a zoom switch 120 for performing a zooming operation of the photographing optical system 104, and a cross switch 122 and a plurality of operation buttons 124 for performing various operations.

In a left side surface of the casing 102, a mode switch 126 for switching the image capturing apparatus 100 to a still image photographing mode, a moving image photographing mode, a reproduction/edition mode and the like is provided.

As shown in FIGS. 3 and 4, in a lower surface of the casing 102, a memory housing chamber 102A that detachably houses the memory card 132 for recording an image, such as a still image or a moving image, and a battery housing chamber 102B that detachably houses the battery 138 serving as a power source of the image capturing apparatus 100 are provided alongside in the front-rear direction (thickness direction) of the casing 102. These memory housing chamber 102A and battery housing chamber 102B are opened and closed by an opening/closing lid 102C joined to a lower surface of the casing 102 through a hinge.

As shown in FIG. 5, the imaging element chip 62 is made of a CCD, CMOS sensor that images a subject image formed by the optical system 104, or the like.

An image taken by the imaging element chip 62 is outputted to an image processing unit 130 as an imaging signal, and the imaging processing unit 130 generates image data of a still image or a moving image based on this imaging signal to record on the memory card (storage medium) 132. Moreover, the image data is displayed on the display 118 by a display processing unit 134.

Furthermore, the image capturing apparatus 100 has a control unit 136 including a CPU or the like that controls the image processing unit 130 and the display processing unit 134 in accordance with the operations of the shutter button 114, the cross switch 122, the operation buttons 124 and the mode switch 126.

Figure 6:
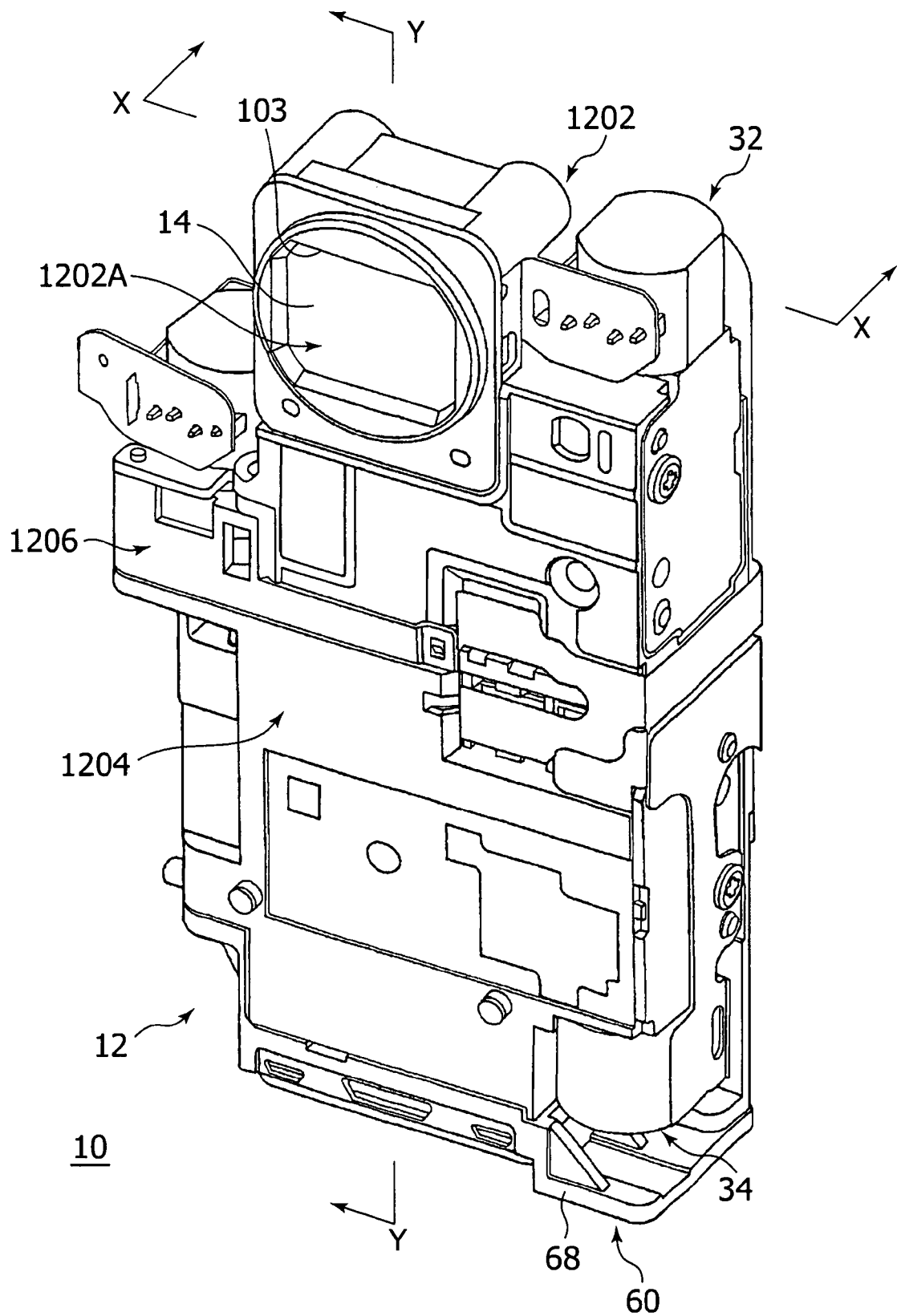
FIG. 6 is a perspective view when a lens barrel 10 is viewed from the slant front side.
Figure 7:
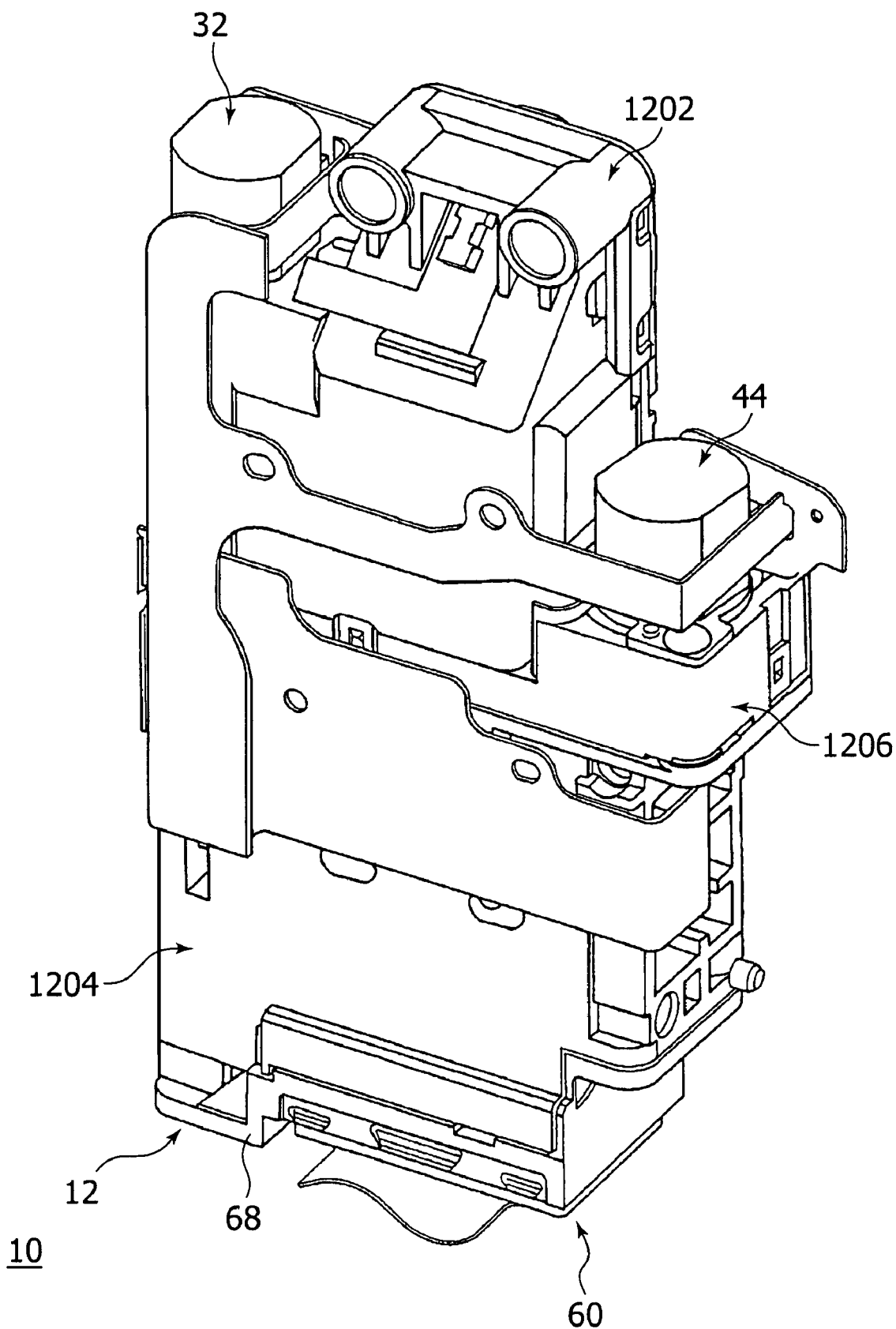
FIG. 7 is a perspective view when the lens barrel 10 is viewed from the slant rear side.
Figure 8:
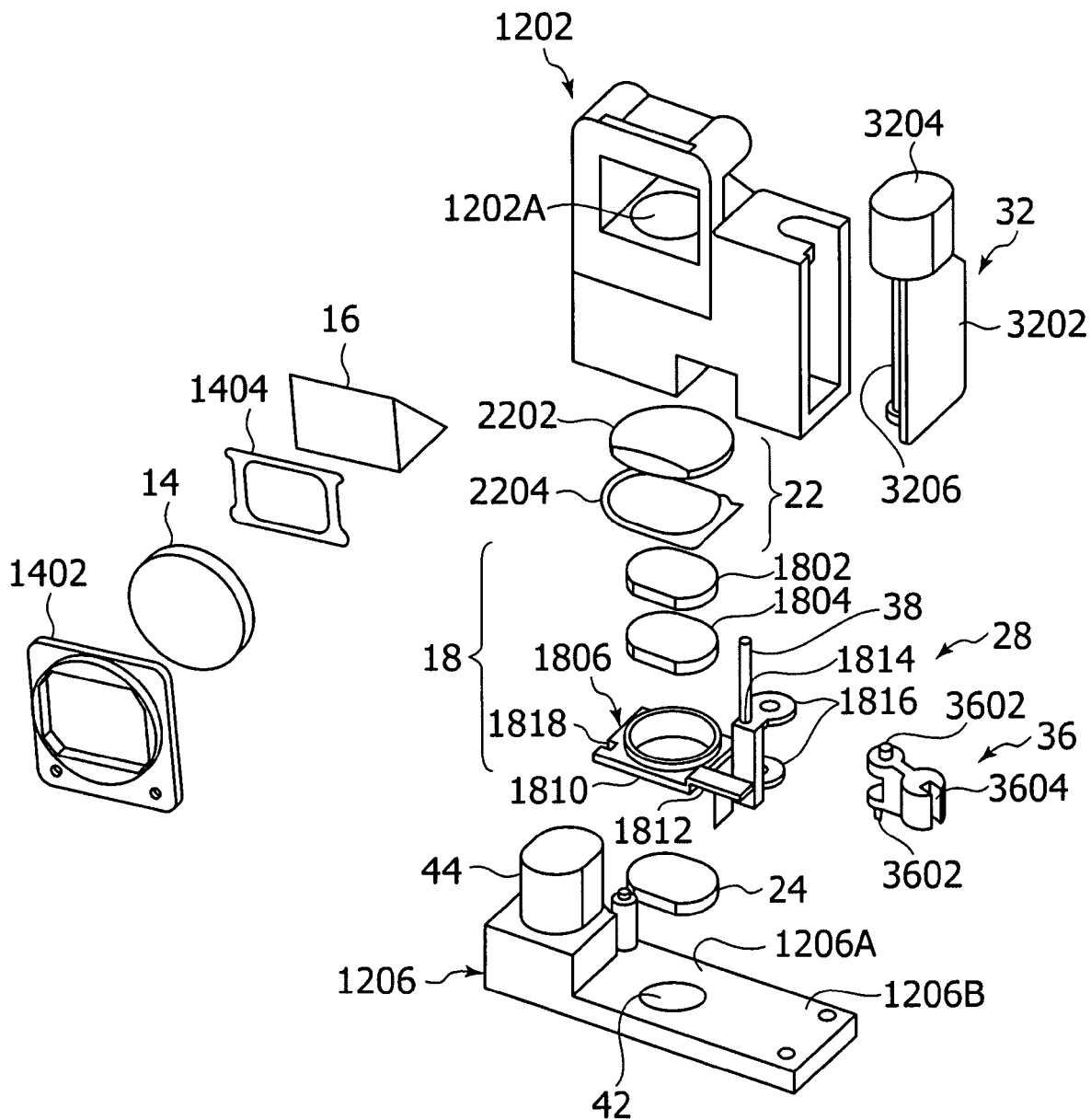
FIG. 8 is an exploded perspective view showing a configuration of a part of the lens barrel 10.
Figure 10:
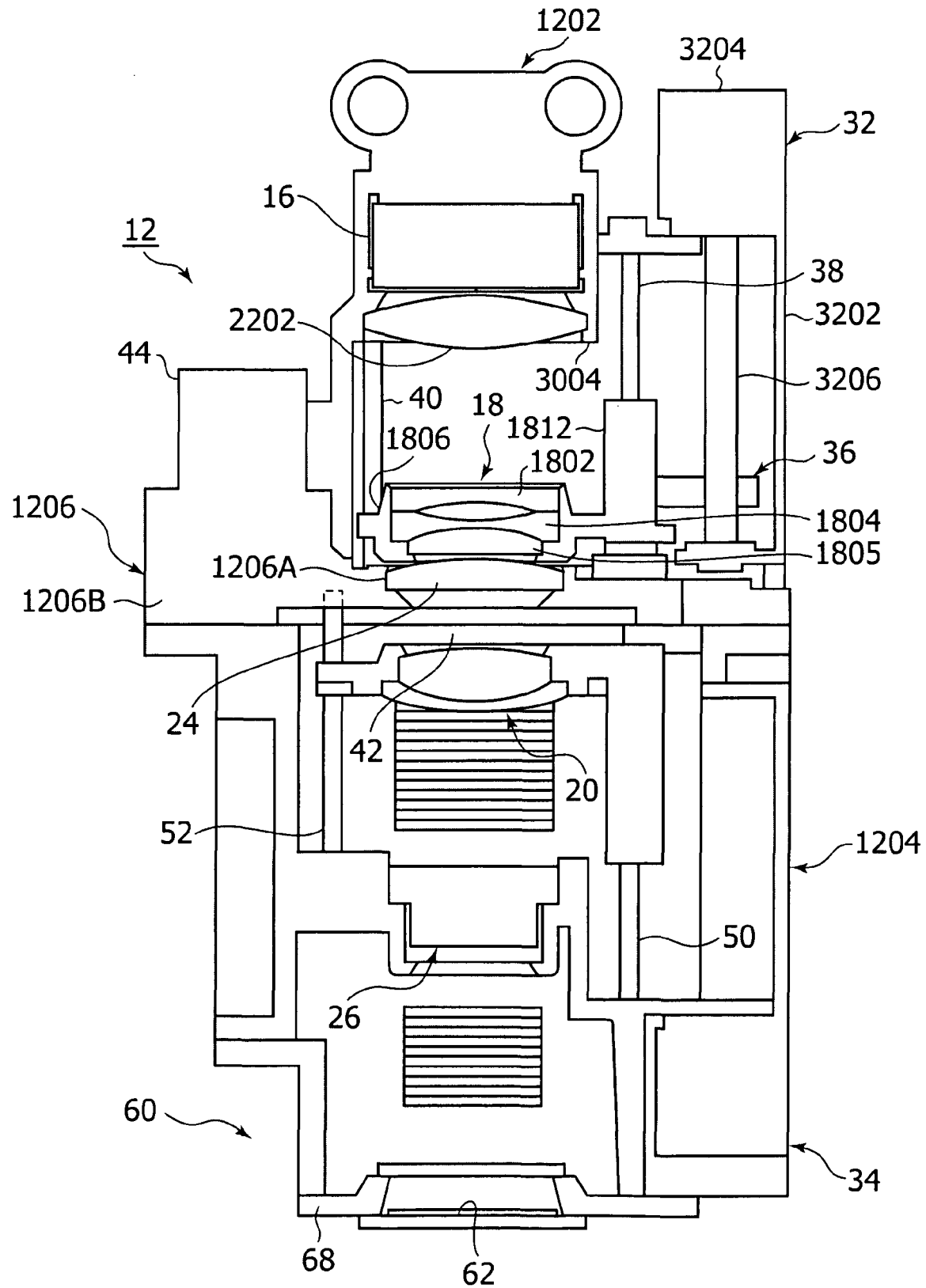
FIG. 10 is a cross-sectional view along XX line of FIG. 6.
Figure 11:
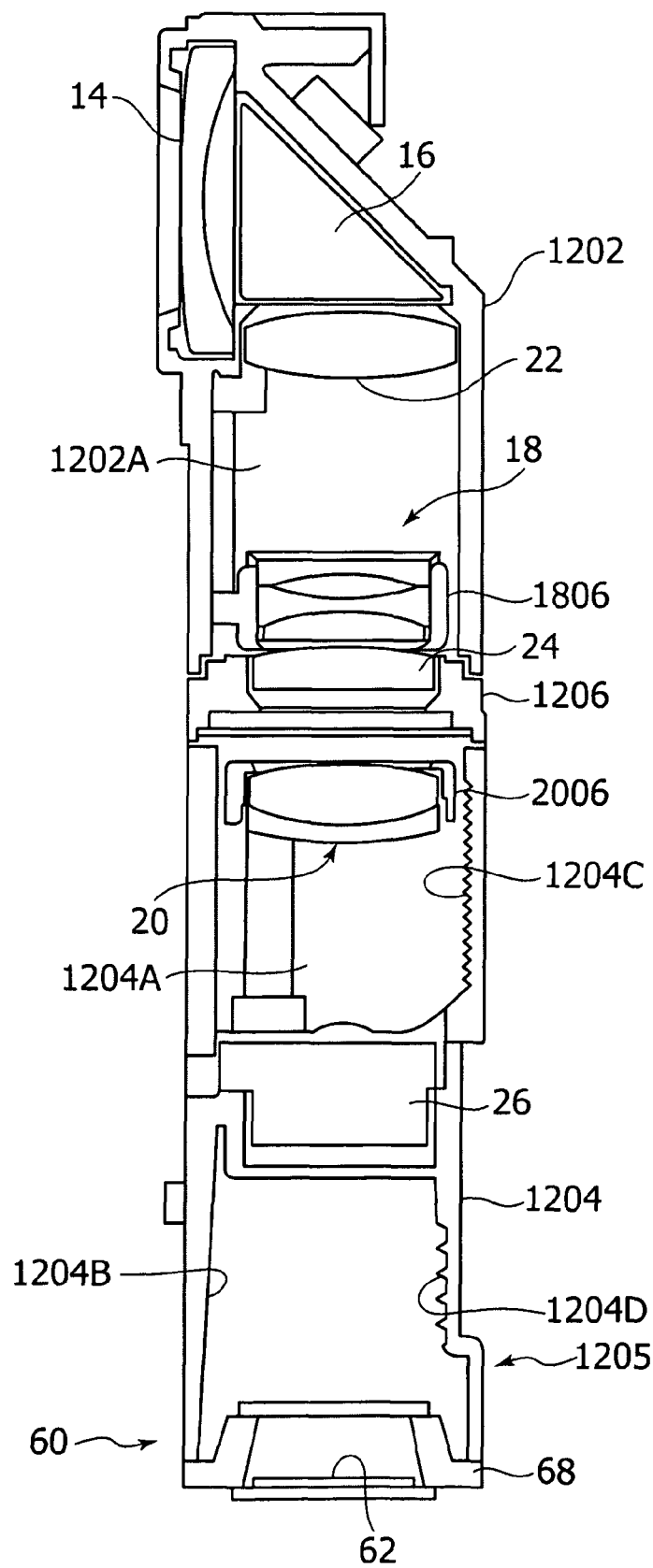
FIG. 11 is a cross-sectional view along YY line of FIG. 6.

FIG. 6 is a perspective view when the lens barrel 10 is viewed from the slant front side; FIG. 7 is a perspective view when the lens barrel 10 is viewed from the slant rear side; FIG. 8 is an exploded perspective view showing a configuration of a part of the lens barrel 10; FIG. 9 is an exploded perspective view showing a configuration of the rest of the lens barrel 10; FIG. 10 is a cross-sectional view along a XX line of FIG. 6; and FIG. 11 is a cross-sectional view along the YY line of FIG. 6.

As shown in FIGS. 6 to 9, the lens barrel 10 includes the barrel 12, the objective lens 14, the imaging element package 60, and the optical system 104.

In the present embodiment, the optical system 104 has a prism 16, a zooming movable lens group 18, a focusing movable lens group 20, a first fixed lens group 22, a second fixed lens group 24, a third fixed lens group 26, a guide mechanism 28 for the zooming movable lens group 18, and a guide mechanism 30 for the focusing movable lens group 20.

Furthermore, a driving means 32 (actuator or the like) that moves the zooming movable lens group 18 and a driving means 34 (actuator or the like) that moves the focusing movable lens group 20 are provided.

As shown in FIGS. 6 and 7, the barrel 12 has a plate shape having a certain width, length and thickness as the whole. The objective lens 14, the imaging element package 60, and the optical system 104 are arranged alongside in a length direction of the barrel 12 in a central portion in a width direction of the barrel 12.

The barrel 12 includes a first barrel section 1202, a second barrel section 1204, and a third barrel section 1206 sandwiched between these two barrel sections 1202 and 1204, which divide the barrel 12 in the length direction. The first barrel section 1202 is located in one of two halves of the barrel 12 in the longer direction, the second barrel section 1204 is located in another half of the barrel 12 in the longer direction, and the third barrel section 1206 is disposed between the first barrel section 1202 and the second barrel section 1204.

As shown in FIGS. 8, 10, 11, an opened component accommodation space 1202A is provided in a lower surface inside of the first barrel section 1202. The objective lens 14 is attached in an upper portion of a front surface of the first barrel section 1202. In a central portion, in a width direction, in a state where a lens pressing member 1402 is located on the front surface side, a light-shielding frame 1404 is located on the rear surface side.

The prism 16 reflects an image caught in the objective lens 14 downward (toward the imaging element package 60 side). In the present embodiment, the prism is used for this purpose. The prism 16 is arranged in a position where it faces the objective lens 14 in the component accommodation space 1202A.

The first fixed lens group 22 and the zooming movable lens group 18 are arranged below the prism 16 inside of the component accommodation space 1202A.

The first fixed lens group 22 is made of a lens 2202 built into an attachment portion of the first barrel section 1202 and a pressing member 2204 that fixes this lens 2202 to the attachment portion (also used as a light-shielding frame).

As shown in FIG. 8, the zooming movable lens group 18 has a first zoom lens 1802, second and third zoom lenses 1804, 1805 stuck to each other, and a zooming lens frame 1806 that supports outer peripheral portions of the first, second and third zoom lenses 1802, 1804, 1805 by caulking.

The zooming lens frame 1806 is located around the first, second and third zoom lens 1802, 1804, 1805, and has a holding portion 1810 that holds these first, second and third zoom lenses 1802, 1804, 1805 and an extending portion 1812 that extends from this holding portion 1810 in the width direction inside of the component accommodation space 1202A.

The extending portion 1812 is provided with rod insertion holes 1814 and flanges 1816 opposed to each other in the longer direction of the barrel 12, and a female screw member 36 having a female screw 3604 is coupled to these flanges 1816 through shafts 3602 while restricting the extending portions motion in the longer direction of the barrel 12.

Moreover, an engagement groove 1818 is formed in a position of the holding portion 1810 located on the opposite side of the extending portion 1812.

A metal main guide shaft 38 extending in the length direction of the first barrel section 1202 is slidably inserted into the rod insertion hole 1814.

Both ends of this main guide shaft 38 in the length direction are supported by a wall portion that serves as an upper surface of the first barrel section 1202 and a wall portion of the third barrel section 1206.

The main guide shaft 38 extends in parallel to the optical axis of the first, second, and third zoom lenses 1802, 1804, 1805. Accordingly, the main guide shaft 38 guides the zooming movable lens group 18 along the optical axis direction of the zooming movable lens group 18.

A subguide shaft 40 (refer to FIG. 10) extending in parallel to the main guide shaft 38 is slidably inserted into the engagement groove 1818. Accordingly, the subguide shaft prevents the zooming movable lens group 18 from rotating around the main guide shaft 38.

The guide mechanism 28 for the zooming movable lens group 18 includes the main guide shaft 38 and the subguide shaft 40.

As shown in FIG. 8, the driving means 32 that moves the zooming movable lens group 18 has a holder 3202 extending in the length direction of the barrel 12, a motor 3204 provided above the holder 3202, and a male screw member 3206 extending along the holder 3202 and rotationally driven by the motor 3204.

The holder 3202 is attached to a notched portion in a right side surface of the first barrel section 1202, by which the male screw member 3206 is located in the component accommodation space 1202A, and the motor 3204 is located on the upper surface of the first barrel section 1202.

The male screw member 3206 is screwed with the female screw 3604 of the female screw member 36. Accordingly, forward and backward rotation of the motor 3204 allows the zooming movable lens group 18 to be reciprocated along the optical axis direction while being guided by the main guide shaft 38 and the subguide shaft 40 for a zooming operation.

As shown in FIG. 8, the third barrel section 1206 has an internal portion 1206A facing the inside of the component accommodation space 1202A and an external portion 1206B located outside of the component accommodation space 1202A.

The second fixed lens group 24 is attached to the inner portion 1206A in a state where its optical axis is caused to coincide with the optical axis of the zooming movable lens group 18, and an iris (diaphragm) 42 is arranged in a rear surface of the second fixed lens 24. This iris 42 is opened and closed by a driving portion 44 attached to the external portion 1206B of the third barrel section 1206.

As shown in FIGS. 9 and 11, in the present embodiment, a component accommodation space 1204A is opened vertically inside of the second barrel section 1204, and by attaching the imaging element package 60 to a lower portion of the second barrel section 1204, a lower end of this component accommodation space 1204A is closed.

The focusing movable lens group 20 and the third fixed lens group 26 are arranged in a position located in the center in a width direction of the second barrel section 1204 inside of the component accommodation space 1204A.

As shown in FIG. 9, the focusing movable lens group 20 has first and second focus lenses 2002, 2004 stuck to each other and a focusing lens frame 2006 that supports these first and second focus lenses 2002, 2004.

The focusing lens frame 2006 is located around the first and second focus lenses 2002, 2004, and has a holding portion 2010 that holds these first and second focus lenses 2002, 2004 and an extending portion 2012 that extends from this holding portion 2010 in the width direction inside of the component accommodation space 1204A.

The extending portion 2012 is provided with rod insertion holes 2014, flanges 2016 opposed to each other in the longer direction of the barrel 12, and a female screw member 48 having a female screw 4804 is coupled to these flanges 2016, 2016 through shafts 4802, 4802 immovably in the longer direction of the barrel 12.

Moreover, an engagement groove 2018 is formed in a position of the holding portion 2010 located on the opposite side of the extending portion 2012.

A metal main guide shaft 50 extending in the length direction of the second barrel section 1204 is slidably inserted into the rod insertion hole 2014. Both ends of this main guide shaft 50 in the length direction are supported by a wall portion of the third barrel section 1206 and a wall portion provided in the lower portion of the second barrel section 1204.

The main guide shaft 50 extends in parallel to the optical axis of the first and second focus lenses 2002, 2004. Accordingly, the main guide shaft 50 guides the focusing movable lens group 20 along the optical axis direction of the focusing movable lens group 20.

A subguide shaft 52 (refer to FIG. 10) extending in parallel to the main guide shaft 50 is slidably inserted into the engagement groove 2018. Accordingly, the subguide shaft 52 prevents the focusing movable lens group 20 from rotating about the main guide shaft 50.

A guide mechanism 30 for the focusing movable lens group 20 is made of the main guide shaft 50 and the subguide shaft 52.

As shown in FIG. 9, the driving means 34 that moves the focusing movable lens group 20 has a holder 3402 extending in the length direction of the barrel 12, a motor 3404 provided under the holder 3402, and a male screw member 3406 extending along the holder 3402 and rotationally driven by the motor 3404.

The holder 3402 is attached to a notched portion in a right side surface of the second barrel section 1204, by which the male screw member 3406 is located in the component accommodation space 1204A, and the motor 3404 is located in a lower portion of the second barrel section 1204.

The male screw member 3406 is screwed with the female screw 4804 of the female screw member 48. Accordingly, the forward and backward rotation of the motor 3404 allows the focusing movable lens group 20 to be reciprocated along the optical axis direction while being guided by the main guide shaft 50 and the subguide shaft 52 for a focusing operation.

The third fixed lens group 26 is arranged in a position of the component accommodation space 1204A below the focusing movable lens group 20, and is made of a third fixed lens group 2602 built into an attachment portion of the second barrel section 1204 and a pressing member 2604 that fixes this third fixed lens group 2602 to the attachment portion.

As shown in FIG. 11, an uneven portion 1204C is provided between an upper end of the second barrel section 1204 and the second fixed lens group 24 in a rear surface of the second barrel section 1204 facing the component accommodation space 1204A.

Moreover, an uneven portion 1204D is provided between the third fixed lens group 26 and the imaging element package 60 in the rear surface of the second barrel section 1204 facing the component accommodation space 1204A.

The uneven portions 1204C, 1204D are provided to prevent the following disadvantage. Of the lights entering through the objective lens 14, the prism 16, the first fixed lens group 22, the zooming movable lens group 18, the second fixed lens group 24 and the focusing movable lens group 20, lights reaching the rear surface of the second barrel section 1204 facing the component accommodation space 1204A are reflected. As a result, a reflected light called flare or ghost occurs, and this reflected light reaches the imaging surface of the imaging element chip 62 of the imaging element package 60 to adversely affect an imaging signal of the imaging element chip 62.

As shown in FIG. 9, a barrel-side attachment portion 1205 for placing the imaging element package 60 in a lower portion of the barrel 12 (lower portion of the second barrel section 1204) is provided.

Figure 15:
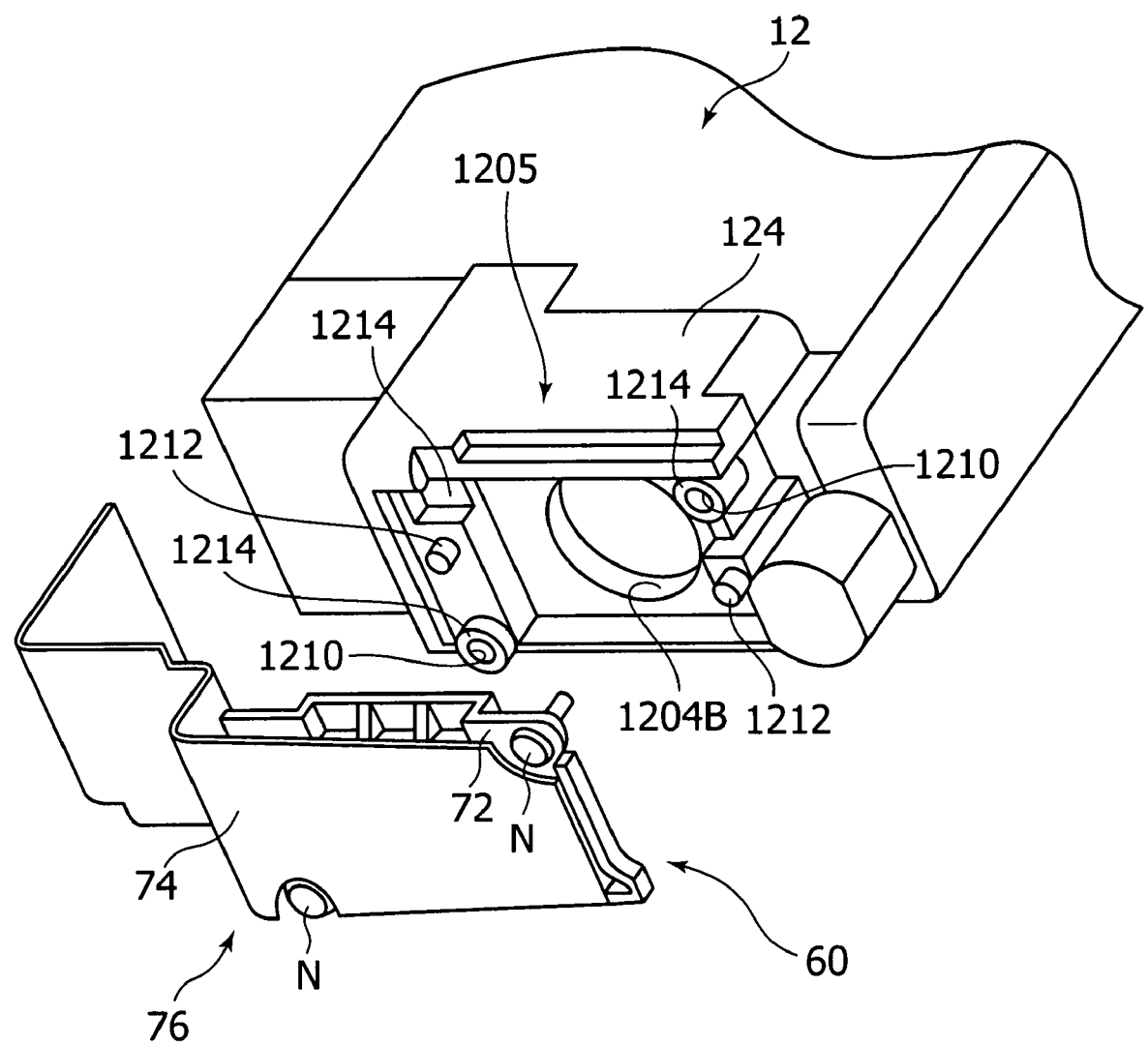
FIG. 15 is an explanatory view of an attachment of the imaging element package 60 to a barrel 12.

As shown in FIG. 15, an opening 1204B allowing the imaging element chip 62 to face the component accommodation space 1204A is provided in the barrel-side attachment portion 1205. Around this opening 1204B, there are provided two female screws 1210 two positioning pins 1212, and positioning surfaces (reference surfaces) 1214 for positioning in the direction along the optical axis for imaging, which are provided in three positions in total, namely, positions around the two female screws 1210, and a position away from the female screws 1210. The positioning surfaces 1214 extend in a surface perpendicular to a through direction of the opening 1204B.

Next, the imaging element package 60, which is the gist of the present embodiment, is described in detail.

Figure 12:
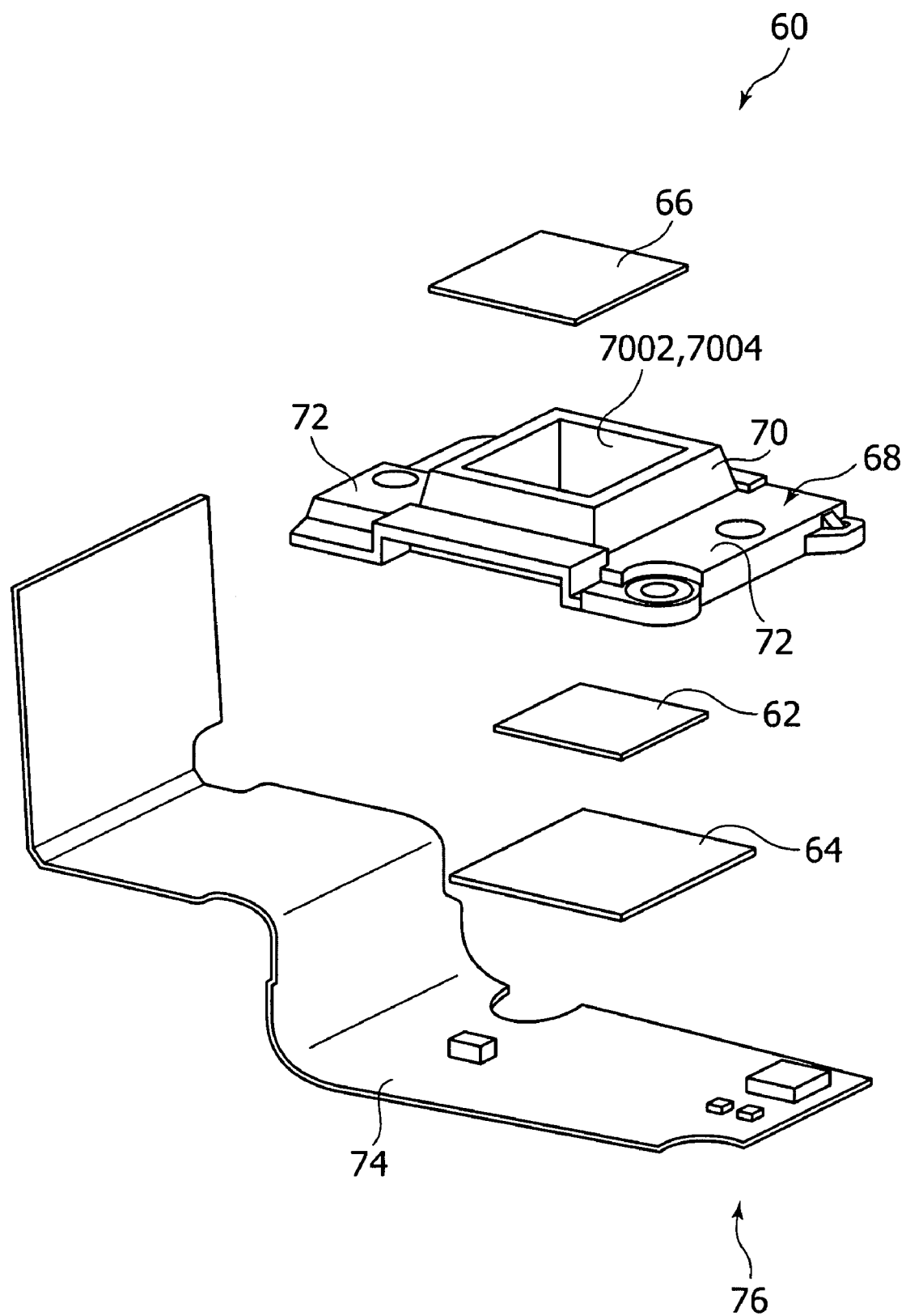
FIG. 12 is an exploded perspective view of an imaging element package 60.
Figure 13:
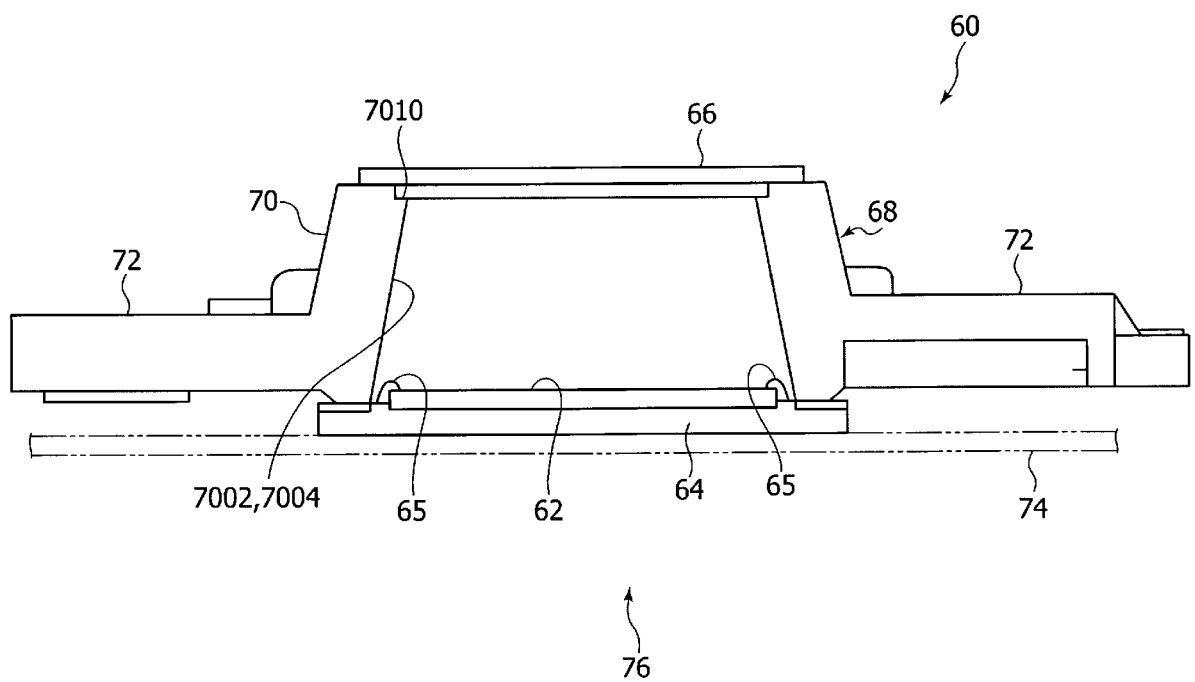
FIG. 13 is a cross-sectional view of the image element package 60.
Figure 14:
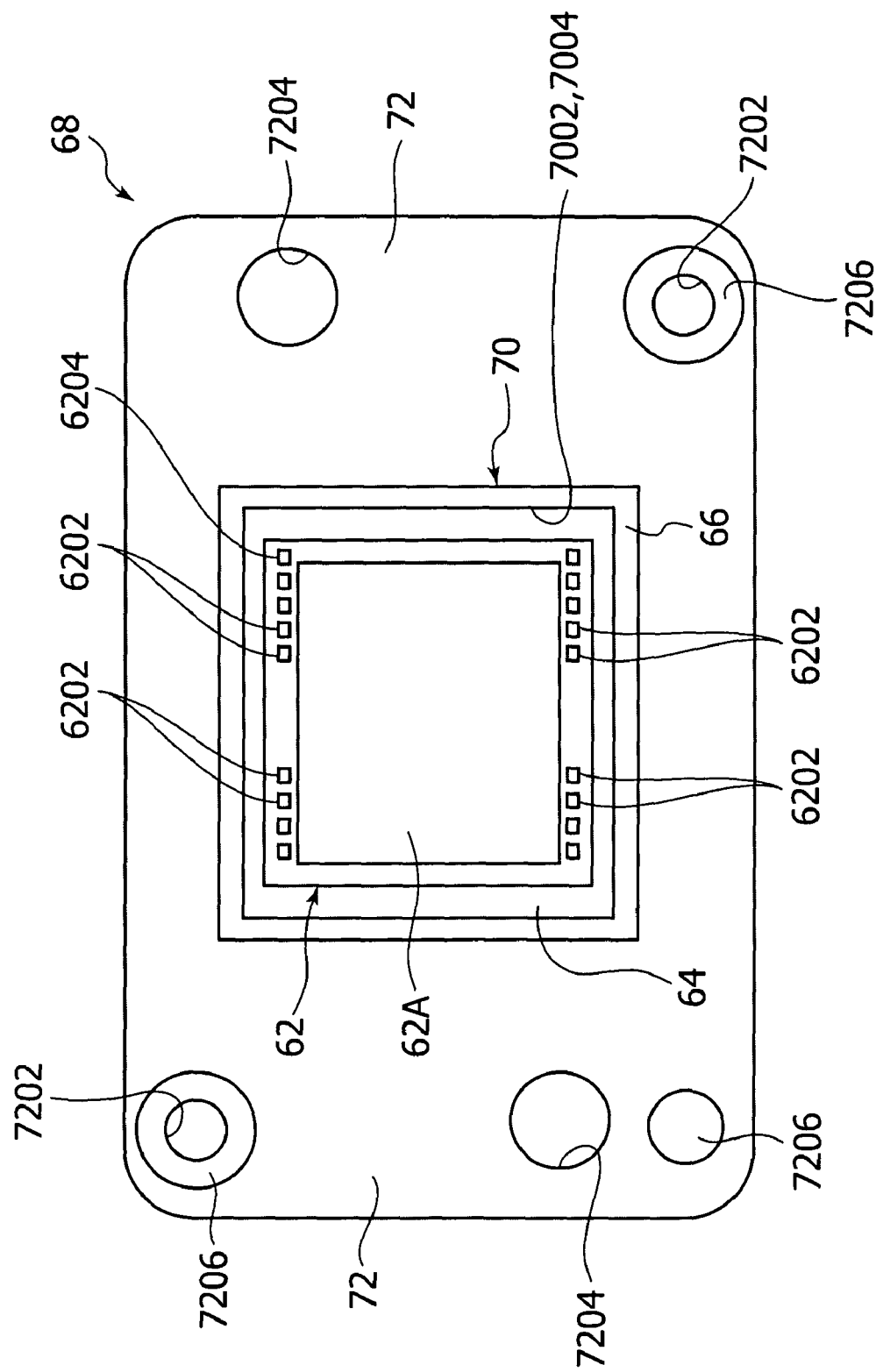
FIG. 14 is a plan view of the imaging element package 60.
Figure 16:
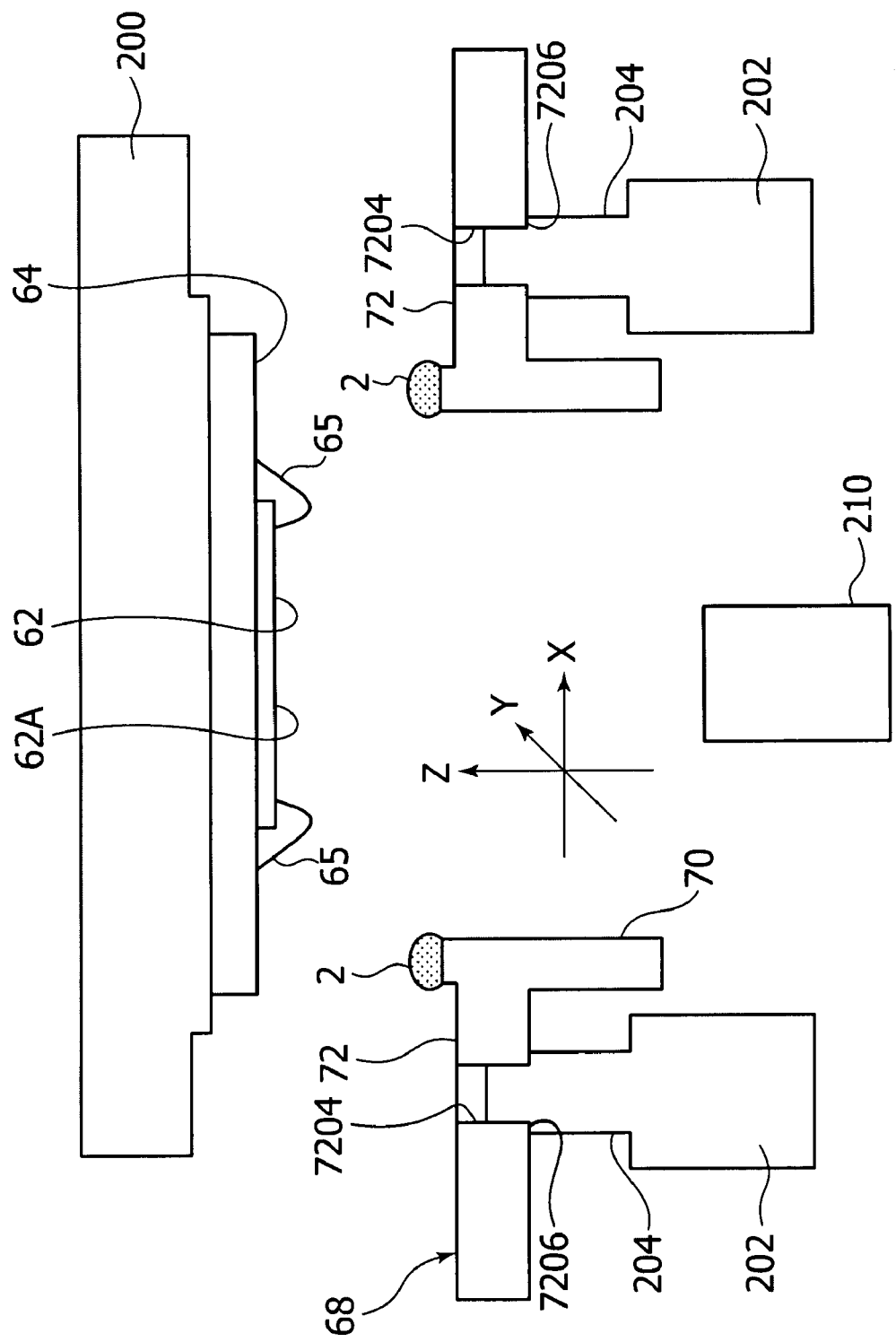
FIG. 16 is an explanatory view for assembling the imaging element package 60.

FIG. 12 is an exploded perspective view of the imaging element package 60; FIG. 13 is a cross-sectional view of the image element package 60; FIG. 14 is a plan view of the imaging element package 60; FIG. 15 is an explanatory view of attachment of the imaging element package 60 to the barrel 12; and FIG. 16 is an explanatory view of assembling the imaging element package 60.

As shown in FIGS. 12 and 13, the imaging element package 60 includes the imaging element chip 62, a substrate 64, an optical member 66, and a supporting body 68.

The imaging element chip 62 is a so-called bare chip, having a rectangular plate-like shape.

As shown in FIG. 14, a rectangular imaging surface 62A is formed in the center of one surface of the imaging element chip 62 in the thickness direction. In a rectangular region around the imaging surface 62A, a plurality of electrode pads 6202 and an alignment mark 6204 (reference point) for positioning, which will be described later, are provided.

The substrate 64 is electrically connected to the imaging element chip 62.

As shown in FIGS. 12 and 13, the substrate 64 has a rectangular plate-like shape with a outline one size larger than that of the imaging element chip 62, and a back surface of the imaging element chip 62 located on the opposite side of the imaging surface 62A is joined with the substrate 64 in the center of one surface of the substrate 64 in the thickness direction with an adhesive, such as a die bond adhesive.

On a front surface of the substrate 64, electrode pads for image element chip connection (not shown) are provided in the positions corresponding to the electrode pads 6202 of the imaging element chip 62. Furthermore, as shown in FIG. 13, the electrode pads 6202 of the imaging element chip 62 (refer to FIG. 14) and the electrode pads for imaging element chip connection are electrically connected through gold wires 65.

Moreover, on a back surface of the substrate 64, external terminals for wiring (not shown) are provided. The external terminals are electrically connected to the electrode pads for imaging element chip connection through internal wiring of the substrate 64.

The electrode pads for wiring are electrically connected to a flexible substrate 74 that serves as a wiring member for sending and receiving the signal to/from the imaging element chip 62. As the wiring member, in addition to the flexible substrate 74, various wiring substrates, such as a multilayer substrate of an organic substrate, may be employed.

In the present embodiment, the electrode pads for connecting to the imaging element chip and the external terminals for wiring are formed by applying nickel-plating or gold plating to tungsten wiring.

In the present embodiment, as described later, the substrate 64 and the flexible substrate 74 are electrically connected by reflow soldering. The substrate 64 is formed of a material having heat resistance for reflow soldering.

As the material having such heat resistance, various materials, such as multilayer high-temperature-fired ceramic or an organic substrate, for example, can be employed.

The optical member 66 allows light to pass through. As the optical member 66, a cover glass, an optical filter, a lens and the like may be used.

In the present embodiment, the optical member 66 is constructed by forming a coating film (coat layer) having an optical filtering function on a surface of a rectangular plate-like cover glass formed of a transparent glass material.

The supporting body 68 has a body portion 70 and an attachment portion 72.

The supporting body 68 is formed of a material having sufficient heat resistance for reflow soldering and easy to work (workable at high precision).

In other words, for the supporting body 68, it is preferable to use a material that shows less changes in its dimension during assembling process and even in heat treatment, such as reflow soldering, and is capable of achieving high machining accuracy and superior moldability.

Moreover, it is necessary that, as described later, the supporting body 68 maintain a positional relationship between the imaging element chip 62 and the supporting body 68 positioned in relation to the alignment mark 6204 of the imaging element chip 62.

In the present embodiment, the supporting body 68 is formed of injection-molding epoxy resin.

The injection-molding epoxy resin enables metal molding with high precision, and allows machining up to an accuracy of several μm, which is optically required.

Moreover, the injection-molding epoxy resin is highly heat resistive. Accordingly, it can maintain the initial machining accuracy without any shape change even at reflow soldering temperatures near 200° C. Thus, the positional relationship of the supporting body 68 positioned in relation to the alignment mark 6204 of the imaging element chip 62 can be maintained during the assembling process and the reflow soldering process.

While in the present embodiment, the high-accuracy injection-molding epoxy material is used for the supporting body 68, by using a heat-resistant plastic material, such as liquid crystal polymer, similar effects can be expected, as long as optical performances, such as machining accuracy and deformation, are satisfied.

In the body portion 70, a through opening 7002 (referred to as simply opening 7002 hereafter) serving as a light path for imaging is formed.

The opening 7002 has a rectangular cross section, and thus, the body portion 70 has a rectangular frame shape.

An inner side portion of the body portion 70 forming the opening 7002 is formed with an inclined surface 7004 such that a cross section of the opening 7002 becomes gradually smaller from one end to the other end in the through direction.

Moreover, in the other end of the inner side portion of the body portion 70, namely, in an end portion closer to the other end of the inclined surface 7004, there is formed a depressed portion 7010 which becomes wider in a direction perpendicular to the through direction of the opening 7002, which collects the superfluous part of the adhesive, and which does not contribute to the adhesion of the optical member 66, which will be described later.

The attachment portion 72 is a portion through which the imaging element package 60 is attached to the attachment portion. In the present embodiment, the attachment portion is the barrel 12 built into the image capturing apparatus 100.

As shown in FIG. 13, the attachment portion 72 is provided in a position of the body portion 70 closer to the one end of the opening 7002 in the through direction.

As shown in FIG. 14, the attachment portion 72 has a rectangular plate-like shape having a larger outline than that of the body portion 70 and expanding in the direction perpendicular to the through direction of the opening 7002.

In the attachment portion 72, two screw insertion holes 7202 and two positioning holes 7204 are formed. These holes 7202, 7204 extend in a direction parallel to the through direction of the opening 7002.

Positioning surfaces (reference surfaces) 7206 for positioning in the direction along the optical axis for imaging are formed in three positions in total, namely, positions around the two screw insertion holes 7202, and a position away from the screw insertion holes 7202, in a surface of the attachment portion 72 located closer to the other end in the through direction. The positioning surfaces 7206 extend in the surface perpendicular to the through direction of the opening 7002.

The substrate 64 is attached to the body portion 70 so as to close the one end of the opening 7002 in the through direction in a state where the imaging surface 62A faces the other end from the one end of the opening 7002 in the through direction.

In the present embodiment, the substrate 64 is joined to the body portion 70 with a thermoset adhesive.

The optical member 66 is attached to the body portion 70 so as to close the other end of the opening 7002 in the through direction.

In the present embodiment, the optical member 66 is joined to the body portion 70 with the thermoset adhesive.

In this manner, the attachment of the substrate 64 and the optical member 66 to both ends of the body portion 70 seals the space where the imaging element chip 62 is placed therein.

The center axis, which passes the center of the imaging surface 62A and is perpendicular to the imaging surface 62A, and the center of axis of the opening 7002 coincide with each other, and the inner side portion of the body portion 70 forming the opening 7002 is formed of the inclined surface 7004 that gradually inclines away from the center axis as it comes close to the imaging element chip 62.

In the present embodiment, the imaging element package includes a fixed diaphragm 80.

The fixed diaphragm 80 limits an area of light that passes through the optical member 66.

The fixed diaphragm 80 prevents stray light inside of the barrel 12 from entering the imaging surface 62A of the imaging element chip 62, and thus prevents a ghost.

The fixed diaphragm 80 is formed integrally with the inner side portion in a position closer to the other end of the opening 7002 in the through direction, in the inner side portion of the body portion 70 where the opening 7002 is formed.

In the present embodiment, the fixed diaphragm 80 is formed in an end portion of the inclined surface 7004 facing the depressed portion 7010, and has a rectangular frame shape in plane view.

There is a concern that a part of the light penetrating through the optical member 66 is reflected at the inner-side surface of the opening 7002 of the body portion 70 and the imaging surface 62A, thereby causing stray light.

In particular, as in the present embodiment, in a case where the optical member 66 is constructed by forming a coating film (coat layer) having an optical filtering function on the surface of a cover glass and the coating film is an IR coat having a function of cutting out infrared light, there is concern that the above-described stray light may be reflected at the interface between the coating film and the cover glass and may enter the imaging surface 62A, thereby causing a red ghost.

In such a case, as the incident angle of the stray light (an angle of the stray light in relation to the normal line perpendicular to the surface of the optical member 66) entering the optical member 66 (the interface) becomes smaller, more components of the stray light penetrate through the interface, and thus the light amount of the stray light reflected at the interface and entering the imaging surface 62A is reduced.

On the other hand, it is found that, as in the present embodiment, if an angle of inclined surface 7004, which is the inner-side surface of the opening 7002, in relation to a virtual line perpendicular to the imaging surface 62A becomes larger, the incident angle of the stray light, which is reflected at the imaging surface 62A and then reflected at the inclined surface 7004, entering the interface becomes smaller.

In the present embodiment, by setting the angle of the inclined surface 7004 in relation to the virtual line perpendicular to the imaging surface 62A to 5 degrees or more, the red ghost can be suppressed.

Alternatively, the fixed diaphragm 80 also may be constructed as follows.

Figure 17:
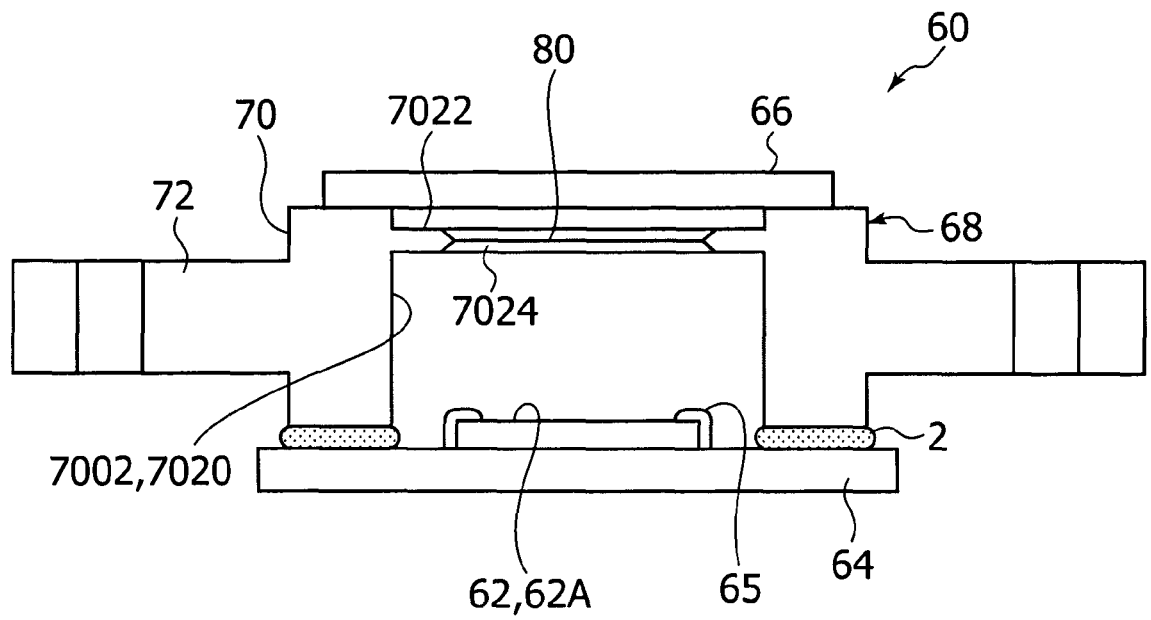
FIG. 17 is a cross-sectional view of an imaging element package 60 showing a modification of the fixed diaphragm 80.
Figure 18:
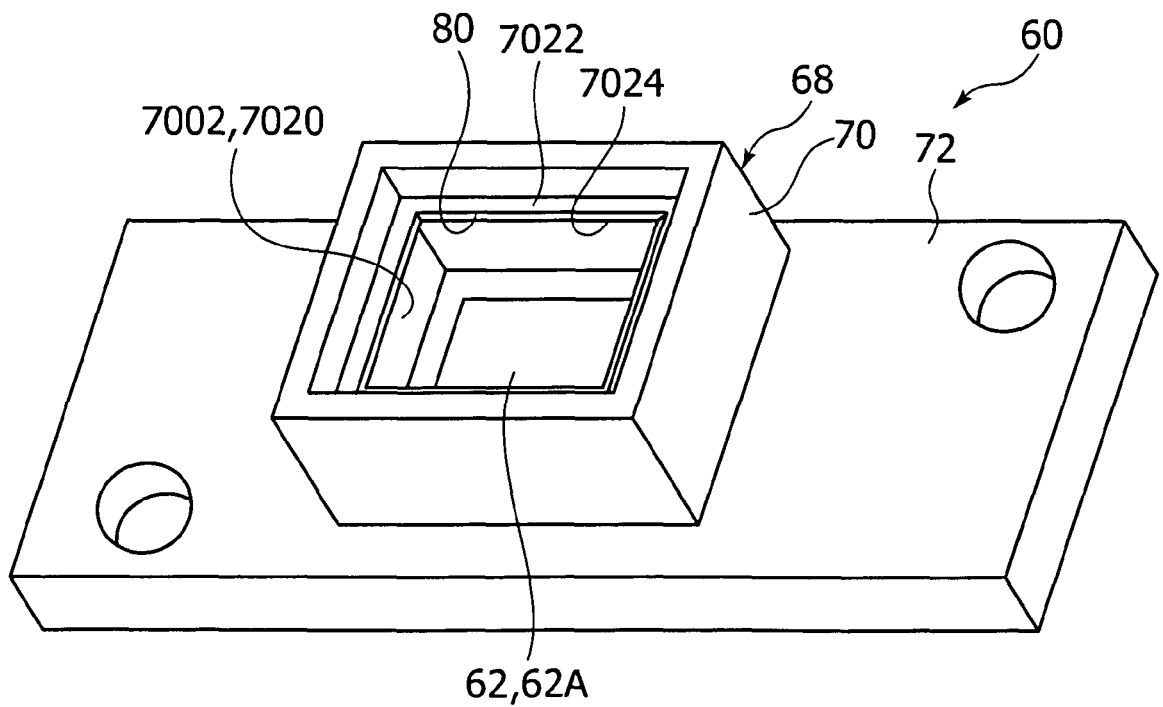
FIG. 18 is a perspective view of the imaging element package 60 showing the modification of the fixed diaphragm 80.

FIG. 17 is a cross-sectional view of the imaging element package 60 showing a modification of the fixed diaphragm 80; and FIG. 18 is a perspective view of the imaging element package 60 showing the modification of the fixed diaphragm 80.

As shown in FIGS. 17, 18, the inner side portion of the body portion 70 is formed of a wall surface 7020 extending in a direction parallel to the through direction of the opening 7002 such that a cross section of the opening 7002 is uniform along the through direction.

A wall portion 7022 is annularly protruded inside of the opening 7002 across the whole circumference in a circumferential direction of the opening 7002 in a position closer to the other end of the wall surface 7020.

An inner side portion of the wall portion 7022 is formed as a projection 7024 whose cross section becomes smaller as it approaches a tip end thereof.

The fixed diaphragm 80 is formed by the wall portion 7022 and the projection 7024.

In this case, since the inner side portion of the wall portion 7022 is formed as the projection 7024 whose cross section becomes smaller as it approaches the tip end, light that hits a surface of the projection 7024 is guided in a direction that is inclined in relation to the through direction of the opening 7002. In other words, in the direction inclined in relation to the virtual line perpendicular to the imaging surface 62A, the stray light entering the imaging surface 62A can be suppressed, which advantageously prevents the occurrence of a ghost.

Next, the assembling of the imaging element package 60 is described.

First, the imaging element chip 62 is joined to the substrate 64 with a die bond adhesive, and the imaging element chip 62 and the substrate 64 are electrically connected through the gold wires 65, by which the imaging element chip 62 is mounted onto the substrate 64.

Next, referring to FIG. 16, the attachment of the substrate 64 with the imaging element chip 62 mounted thereon to the supporting body 68 is described.

First, an adjustment jig used for this attachment is described.

The adjustment jig includes an upper head 200, a surface plate or level block 202, fixing pins 204, a CCD camera 210, an image recognizing device (not shown in the figure), a mounting device (not shown) and the like.

The upper head 200 holds the substrate 64 with the imaging element chip 62 mounted in a vertically inverted state, namely, in a state where the imaging surface 62A of the imaging element chip 62 is oriented downward.

The upper head 200 is constructed so as to move along a X axis, a Y axis and a Z axis perpendicular to one another and rotate about these three axes by the mounting device.

The surface plate 202, whose flatness is ensured, is provided and fixed below the upper head 200 and extends in parallel along a plane including the X axis and Y axis.

The two fixing pins 204 are projected upward (in the Z axis direction) from the surface plate 202, and by inserting them into the two positioning holes 7204 of the supporting body 68, the supporting body 68 is fixed and supported in the extending directions of the respective X axis, Y axis and Z axis.

The CCD camera 210 is provided such that it can image the imaging surface 62A of the imaging element chip 62 through the opening 7002 of the supporting body 68 supported by the fixing pins 204.

Next, the attachment of the substrate 64 to the supporting body 68 is described.

The substrate 64 with the imaging element chip 62 mounted is fixed to the upper head 200.

Next, the fixing pins 204 are fitted into the positioning holes 7204 of the supporting body 68 to fix the supporting body 68 to the surface plate 202.

At this time, the inclination of the supporting body 68 is defined by the positioning surfaces 7206 of the supporting body 68, and rotation directions (rotation angle θ directions) about the respective axes of the X axis, Y axis, and Z axis are defined by the positioning holes 7204.

Next, a thermoset adhesive 2 is applied to one end of the body portion 70 of the supporting body 68, and the alignment mark 6204 (refer to FIG. 14) of the imaging surface 62A and the positioning holes 7204 are photographed by the CCD camera 210. The photographed images are analyzed by the image recognizing device. Based on the analysis result, the upper head 200 is moved in the X axis direction, in the Y axis direction, and in the rotation direction about the Z axis, respectively, thereby to perform the positioning of the imaging element chip 62 and the supporting body 68 in the XY plane.

Accordingly, the positioning of the imaging element chip 62 and the positioning holes 7204 of the supporting body 68 in the XY plane may be performed.

Once the positioning in the XY plane is performed, by using the image recognizing device and the mounting device, a Rx adjustment in a plane defined by the X axis and the Z axis, namely, positioning in the rotation direction about the Y axis, and a Ry adjustment in a plane defined by the X axis and the Z axis, namely, positioning in the rotation direction about the X axis, are performed.

The positioning is performed such that the imaging surface 62A of the imaging element chip 62 and the positioning surface 7206 of the supporting body 68 become parallel.

More specifically, the center axis, which passes the center of the imaging surface 62A and is perpendicular to the imaging surface 62A, and the center of axis of the opening 7002 coincide with each other.

Next, the substrate 64 is moved in the Z axis direction while retaining the relative positional relationship of the imaging element chip 62 and the supporting body 68. The surface of the substrate 64 and the one end of the body portion 70 of the supporting body 68 are caused to abut against each other, and the thermoset adhesive 2 is heated so as to be cured using a heater (not shown in the figure).

Accordingly, assembly of the substrate 64 with the imaging element chip 62 mounted to the one end of the body portion 70 of the supporting body 68 is completed while positioning of the imaging element chip 62 and the positioning holes 7204 and the positioning surfaces 7206 of the supporting body 68 is being made.

In the present embodiment, it was confirmed that the formation of the supporting body 68 using the above-described injection-molding epoxy resin enables adjustments with a high precision, exceeding the process capability index of 1.5, at the accuracy of ±30 μm in the X axis direction, the accuracy of ±30 μm in the Y axis direction, and the accuracy of ±0.5° in the rotation direction θ about the Z axis, a Rx adjustment of 6' in the plane defined by the X axis and the Z axis, and a Ry adjustment of 6' in the plane defined by the Y axis and the Z axis.

Next, the attachment of the optical member 66 to the supporting body 68 is described.

First, the thermoset adhesive 2 is applied to the other end in the axial direction of the opening 7002 of the body portion 70 of the supporting body 68.

Next, the optical member 66 is placed onto the other end of the body portion 70, and the thermoset adhesive 2 is heated to cure using a heater (not shown in the figure).

Accordingly, the assembling of the optical member 66 to the other end of the body portion 70 is completed, thereby completing the assembling of the imaging element package 60.

While in the present embodiment the case where the thermoset adhesive 2 is used for adhesion of the substrate 64 and the optical member 66 to the supporting body 68 is described, obviously, an UV curing adhesive may be used.

However, in the case where the UV curing adhesive is used, a certain amount of time is required for irradiating the UV curing adhesive with UV rays evenly. On the other hand, in the case where the thermoset adhesive 2 is used, the use of the heater allows the thermoset adhesive 2 placed between the substrate 64 and the supporting body 68 to be evenly heated in a simple and reliable manner. Thus, the thermoset adhesive 2 is advantageous in that its curing can be reliably performed in a short time.

Next, the assembling of the imaging element package 60 and the flexible substrate 74 is described.

The assembling of the imaging element package 60 and the flexible substrate 74 is performed by electrically connecting the external terminals for wiring in the back surface of the substrate 64 and the terminals for wiring provided in the flexible substrate 74 by reflow soldering.

In this manner, the imaging element package 60 is assembled to the flexible substrate 74, thereby constructing an imaging element module 76.

Next, the assembling of the imaging element module 76 to the barrel 12 is described.

As shown in FIG. 15, the body portion 70 of the supporting body 68 is inserted into the opening 1204B of the barrel 12, and the respective positioning pins 1212 of the attachment portion 1205 on the barrel side are inserted into the respective positioning holes 7204 of the attachment portion 72, respectively. By causing the respective positioning surfaces (reference surfaces) 7206 of the attachment portion 72 to abut against the respective positioning surfaces (reference surfaces) 1214 of the attachment portion 1205 on the barrel side, the positioning of the imaging element module 76 in relation to the barrel 12 is performed.

While the positioning is being performed, screws N are screwed into the respective female screws 1210 through the respective screw insertion holes 7202 of the attachment portion 72.

Accordingly, the imaging element package 60 is attached to the barrel 12 with the optical member 66 being directed to the inside of the barrel 12, namely, with the imaging surface 62A being located on the optical axis of the light path inside of the barrel 12, thereby completing the assembling of the imaging element module 76 to the barrel 12.

As described above, in the present embodiment, the imaging element package 60 includes the imaging element chip 62, the substrate 64 on which the imaging element chip 62 is mounted, the optical member 66, and the supporting body 68.

Accordingly, as compared with a related art imaging element unit and the like, a reduction in the number of parts and a simplification of the configuration can be achieved. Such a configuration is advantageous in reducing the costs of parts and assembly work and in realizing a downsizing.

More specifically, the related art imaging element unit has a structure in which an imaging element portion is mounted on a flexible substrate, which is a wiring member. In the imaging element portion, an imaging element chip is accommodated in a depressed portion of a package, and the depressed portion is sealed by a seal glass. Furthermore, the imaging element portion is assembled to a holder, and a sealing rubber and an optical member are placed on the seal glass in order of mention. Furthermore, the optical member is fixed to the holder by a pressing member thereby to seal the space between the seal glass and the optical element. Thus, the number of parts becomes larger and the assembling cost becomes higher.

In contrast, in the present embodiment, the substrate 64 is attached to the body portion 70 so as to close the one end of the opening 7002 in the through direction in the state where the imaging surface 62A faces the other end from the one end of the opening 7002 in the through direction. The optical member 66 is attached to the body portion 70 so as to close the other end of the opening 7002 in the through direction, by which the imaging element chip 62 is sealed. Thus, not only the seal glass and the seal rubber for sealing the imaging element chip are not required, but also the space between the seal glass and the optical member can be omitted. Such a configuration is advantageous in reducing the costs of parts and assembly work and in realizing a downsizing.

Furthermore, in related art, since a double sealing structure has been employed where the depressed portion in which the imaging element chip is housed is sealed by the seal glass and an end portion of the seal rubber placed on the seal glass is sealed by the optical member, the structure of the package is complicated. In the related art, dedicated spaces in both the directions parallel and perpendicular to the photographing optical axis are required, making the cost of parts higher and being disadvantageous in achieving downsizing.

In the present embodiment, the substrate 64 is used in place of the package of the complicated shape having the depressed portion, and the optical member 66 also can be used as the seal glass for sealing the imaging element chip, which advantageously reduces the cost of parts and realizes the downsizing in both the directions parallel and perpendicular to the photographing optical axis.

Moreover, in the present embodiment, since the supporting body 68 is formed of a material having sufficient heat resistance for reflow soldering, the substrate 64 can be mounted on the flexible substrate 74 as the wiring member by reflow soldering, while both the substrate 64 with the imaging element chip 62 mounted thereon and the optical member 66 are being joined to the supporting body 68 with the adhesive.

Accordingly, since even if the reflow soldering applies high temperatures, the supporting body 68 is neither deformed nor damaged, the position accuracy of the imaging element chip 62 (imaging surface 62A) in relation to the supporting body 68, or the position accuracy of the imaging element chip 62 in relation to the barrel 12, or the position accuracy of the imaging element chip 62 in relation to the photographing optical axis obviously can be ensured, and the assembling work of the imaging element package 60 and the imaging element module 76 is simplified advantageously.

Moreover, in the above-described configuration, the imaging element package 60 includes the imaging element chip 62, the substrate 64 on which the imagine element chip 62 is mounted, the optical member 66, and the supporting body 68. The fixed diaphragm 80 is provided integrally with the inner side portion of the supporting body 68.

Accordingly, as compared with the related art imaging element unit and the like, a reduction in the number of parts and a simplification of configuration can be achieved. Such a configuration is advantageous in reducing the costs of parts and assembly work and in realizing a downsizing.

More specifically, in the related art imaging element unit, the imaging element portion is mounted onto the flexible substrate, which is the wiring member. In the imaging element unit, the imaging element chip is housed in the depressed portion of the package, and the depressed portion is sealed by the seal glass. Subsequently, the imaging element portion is assembled to the holder, the sealing rubber is placed on the seal glass, and a light-shielding sheet for forming a fixed diaphragm is placed on the seal rubber. Furthermore, the optical member is placed on the light-shielding sheet, and the optical member is fixed to the holder by the pressing member thereby to seal the space between the seal glass and the optical element. Accordingly, the number of the parts is larger, and the assembling cost is higher.

In contrast, in the above-described configuration of the present embodiment, the substrate 64 is attached to the body portion 70 so as to close the one end of the opening 7002 in the through direction while the imaging surface 62A facing the other end from the one end of the opening 7002 in the through direction, and the optical member 66 is attached to the body portion 70 so as to close the other end of the opening 7002 in the through direction, by which the imaging element chip 62 is sealed. The fixed diaphragm 80 is provided integrally with the inner side portion of the supporting body 68. Thus, not only the seal glass and the seal rubber for sealing the imaging element chip are not required, but also the space between the seal glass and the optical member can be omitted. The light-shielding sheet, which has been required in related art, is not required. Such a structure is advantageous in reducing the cost of parts and the assembling cost, and in realizing a downsizing.

Furthermore, in the related art, the double sealing structure has been employed where the depressed portion in which the imaging element chip is housed is sealed by the seal glass, and the end portion of the seal rubber placed on the seal glass is sealed by the optical member. The structure of the package is complicated, and dedicated spaces are required in both directions parallel and perpendicular to the photographing optical axis. Accordingly, the cost of parts is higher, and the related art is disadvantageous in downsizing.

In the above-described configuration of the present embodiment, the substrate 64 is used in place of the package of the complicated shape having the depressed portion, and the optical member 66 also can be used as the seal glass for sealing the imaging element chip, which advantageously reduces the cost of parts and realizes the downsizing in both the directions parallel and perpendicular to the photographing optical axis.

Moreover, in the above-described configuration of the present embodiment, since the supporting body 68 is formed of a material having sufficient heat resistance for reflow soldering, the substrate 64 can be mounted on the flexible substrate 74 as the wiring member by reflow soldering, in the state where both the substrate 64 with the imaging element chip 62 mounted thereon and the optical member 66 are being joined to the supporting body 68 with the adhesive.

Accordingly, since even if a high temperatures is used during the reflow soldering, the supporting body 68 is neither deformed nor damaged, the position accuracy of the imaging element chip 62 (imaging surface 62A) in relation to the supporting body 68, or the position accuracy of the imaging element chip 62 in relation to the barrel 12, or the position accuracy of the imaging element chip 62 in relation to the photographing optical axis obviously can be ensured and the assembling work of the imaging element package 60 and the imaging element module 76 is advantageously simplified.

Second Embodiment

Next, the second embodiment of the present invention is described.

Figure 20:
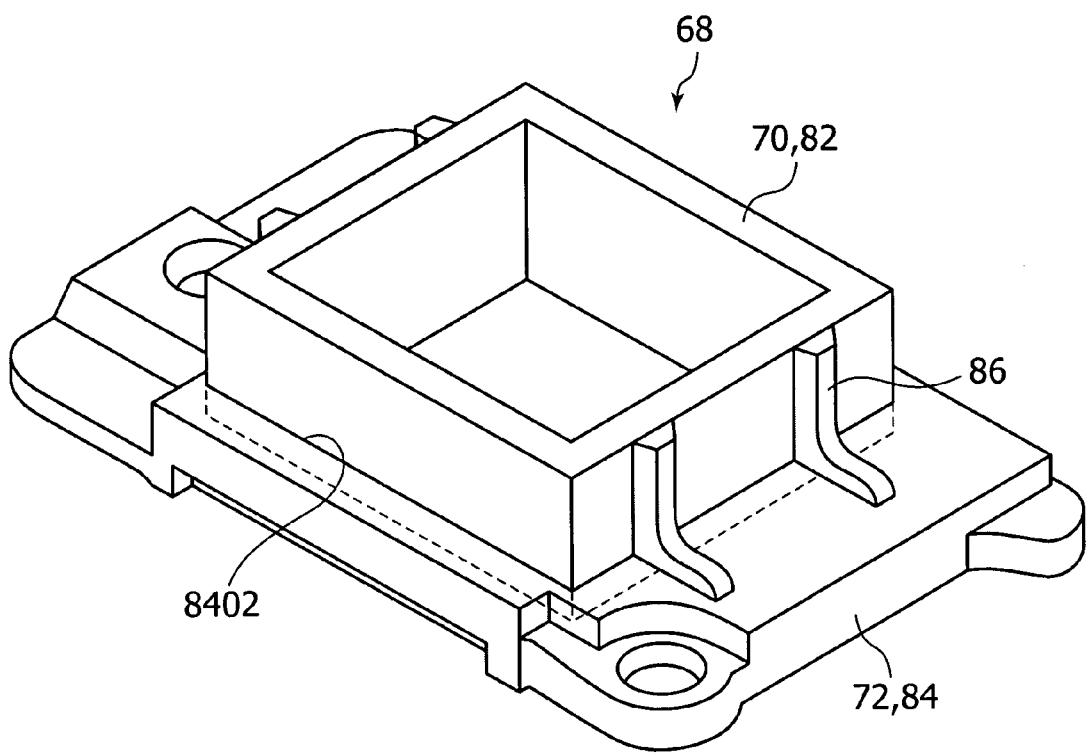
FIG. 20 is an explanatory view for assembling the supporting body 68 of the second embodiment.
Figure 21:
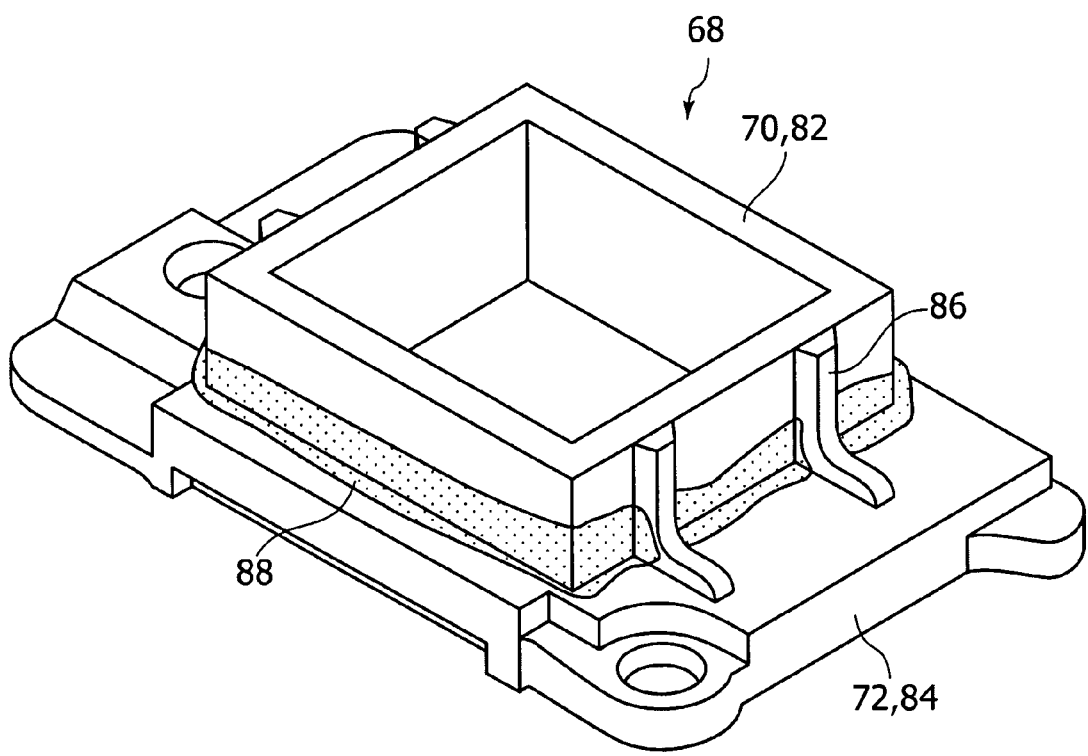
FIG. 21 is an explanatory view for assembling the supporting body 68 of the second embodiment.
Figure 22:
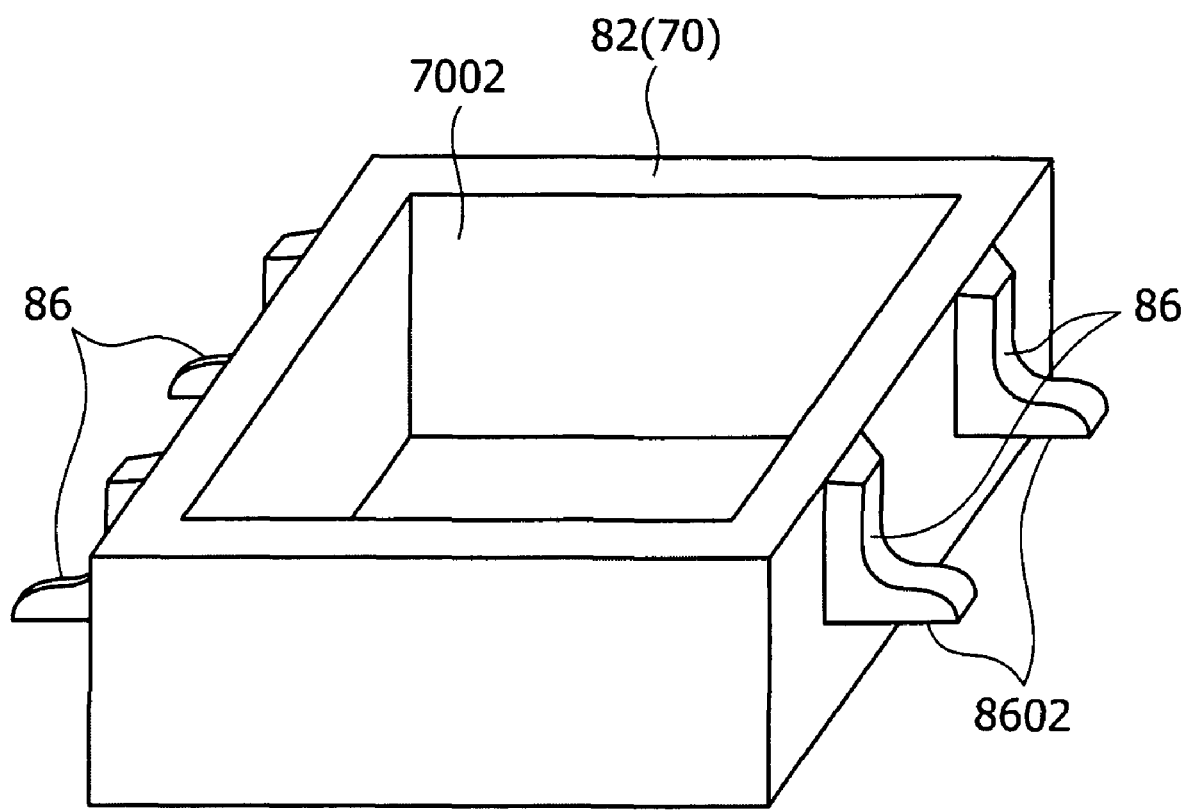
FIG. 22 is a perspective view of a body portion 70 of the second embodiment.
Figure 23:
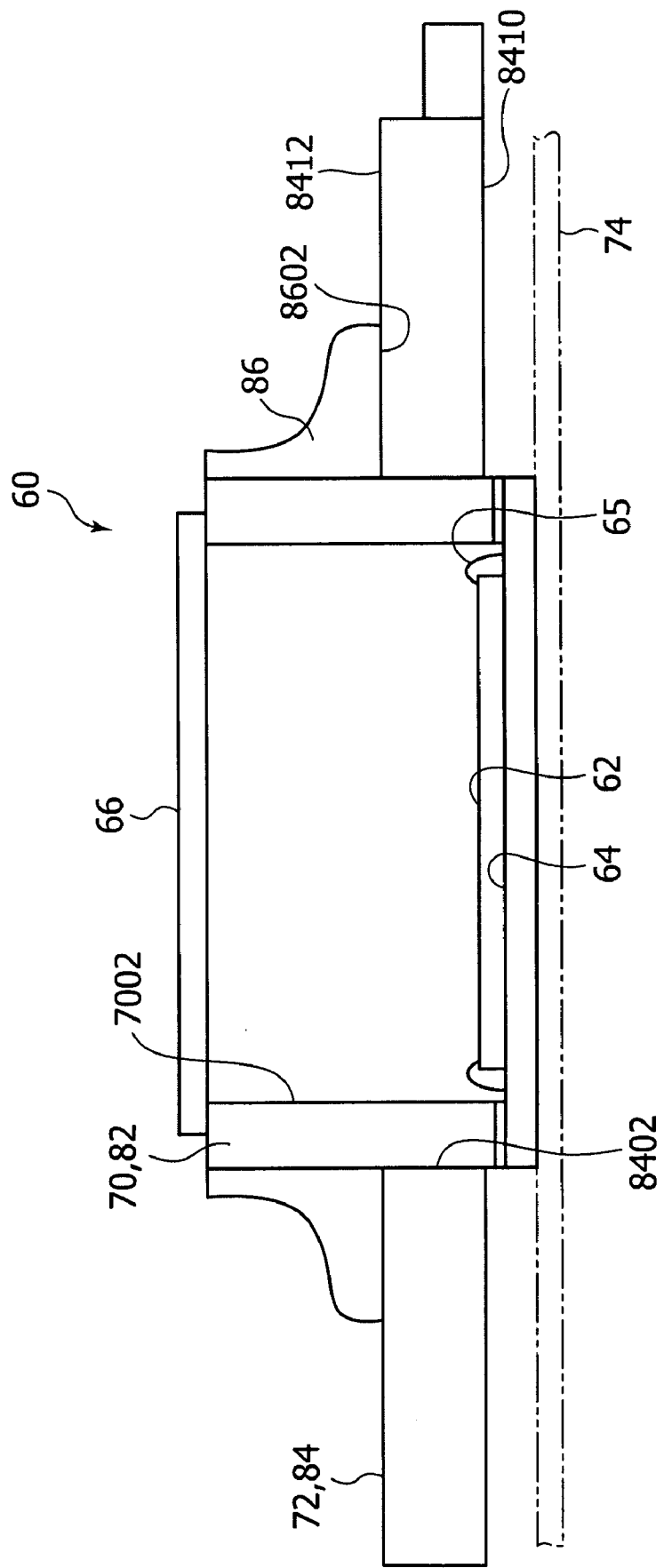
FIG. 23 is a cross-sectional view of an imaging element package 60 of the second embodiment.
Figure 24:
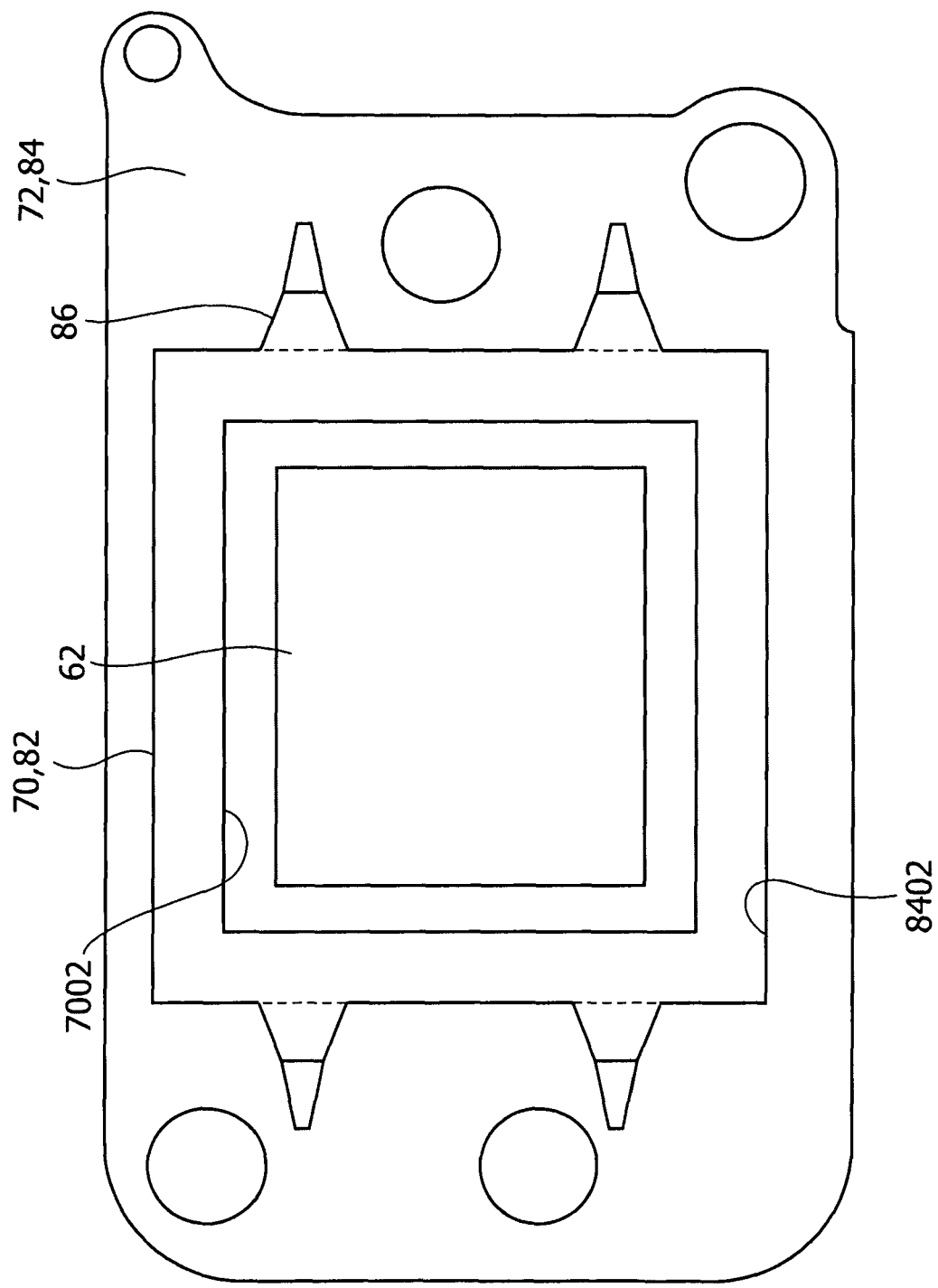
FIG. 24 is a plan view of the imaging element package 60 of the second embodiment.

FIG. 19 is an exploded perspective view of a supporting body 68 of the second embodiment. FIG. 20 is an explanatory view for assembling a supporting body 68 of the second embodiment. FIG. 21 is an explanatory view for assembling the supporting body 68 of the second embodiment. FIG. 22 is a perspective view of a body portion 70 of the second embodiment. FIG. 23 is a cross-sectional view of an imaging element package 60 of the second embodiment. FIG. 24 is a plan view of the imaging element package 60 of the second embodiment.

The second embodiment is different from the first embodiment in that a body portion 70 of a supporting body 68 and an attachment portion 72 are made of different materials from each other. More specifically, as shown in FIGS. 19, 20 and 21, the supporting body 68 of the body portion 70 is formed with a body portion member 82 made of a ceramic material and the attachment portion 72 is formed with an attachment member 84 made of a metal material, completing the supporting body 68 by assembling these parts together.

As the ceramic material forming the body portion member 82, a fired ceramic material may be used.

The ceramic material (fired ceramic material) has an insulation property and is suitable for accommodating an imaging element chip 62. The material has a low moisture permeability is superior in preventing moisture from entering therein and can provide an excellent airtightness. Furthermore, the thermal conductivity of the ceramic material (fired ceramic material) is about 20-30 W/mk, exhibiting a superior heat dissipating property in comparison with a plastic molded product (0.5-0.8 W/mk).

As shown in FIGS. 22 and 23, the body portion member 82 has a rectangular tubular shape, and its internal space serves as a opening 7002.

The outside surface of the body portion member 82 includes four side surfaces. Of these side surfaces, two side surfaces facing each other are provided with positioning portions 86. The positioning portions 86 are formed by bulging.

In each of two side surfaces, two positioning portions 86 are formed. For each positioning portion 86, there is formed a positioning surface 8602 that is orthogonal to the side surfaces at a position such that the positioning portion 86 is in the middle point in the lengthwise direction of the body portion member.

Kovar may be used as the metal material for the attachment portion member 84.

Kovar is an alloy in which nickel and cobalt are mixed with iron, and it is known as a material suitable for glass welding (glass deposit).

Kovar's thermal conductivity coefficient is 19.7 W/mk, and it has a heat dissipation property as high as the ceramic material (fired ceramic material).

Kovar also is suitable for the attachment portion 72 since it has superior mechanical properties and is easy to work with, making it possible to produce parts with higher precision.

The attachment portion member 84 has, as shown in FIGS. 20 and 23, a rectangular plate shape with a larger profile than the body portion member 82 has. The attachment portion member 84 is provided with a rectangular insertion hole 8402 formed at the center thereof, into which the body portion member 82 is inserted. The hole 8402 is formed through the attachment portion member 84 in a direction orthogonal to the thickness wise direction of the attachment portion member 84.

The attachment portion member 84 has the first surface 8410 and the second surface 8412 disposed on both ends of the thickness-wise direction. The first surface 8410 is positioned on a side of the body portion 70 on which the substrate 64 is disposed. The second surface 8412 is positioned on a side of the body portion 70 on which an optical member is disposed.

The positioning portion 86 is structured such that the body portion member 82 comes into contact with the second surface 8602 of the attachment portion member 84 when the body portion member 82 is inserted into the insertion hole 8402, thereby performing the positioning of the body portion member 82 against the attachment portion member 84 along the through direction of the insertion hole 8402.

The supporting body 68 is formed by integrating the body portion member 82 and the attachment portion member 84 while the body portion member 82 is inserted into the insertion hole 8402.

The integration of the body portion member 82 and the attachment portion member 84 may be performed by employing a variety of attachment methods in related art, such as the use of adhesive. In the present embodiment, as shown in FIG. 21, an outer circumference surface of the body portion member 82 is glass-welded on part of the attachment portion member 84 facing the outer circumference surface while the body portion member 82 is being inserted into the insertion hole 8402.

In glass welding, a deposit glass 88 melted by heat is used for welding (deposit, seal) between the outer circumference surface of the body portion member 82 and the part of the attachment portion member 84 facing the outer circumference surface.

Joining a metal material and a ceramic material by glass welding secures sufficient strength in the junction even in a high temperature environment, such as reflow soldering, thereby giving an advantage over the related art methods.

The linear expansion coefficient of Kovar is $5 \times 10^{-6}$/° C., which is very close to that of a ceramic material (a fired ceramic material), which is $7 \times 10^{-6}$/° C. Accordingly, it is advantageous to join Kovar and the fired ceramic material since such a structure can deliver a highly reliable junction.

The second embodiment has the following advantages in addition to the advantages of the first embodiment.

Forming the body portion 70 from the body portion member 82 made of a ceramic material enables reducing the moisture permeability of the body portion 70 to very low level, and therefore is advantageous in protecting the imaging element chip 62 that is susceptible to ambient moisture and ensuring high durability and reliability of the imaging element package 60.

Furthermore, forming the attachment portion 72 from the attachment portion member 84 made of a metal material is advantageous in ensuring a high resistance against external impacts applied on the attachment portion 72 due to a fall of the device, or vibration, or the like.

Furthermore, heat generated by the imaging element chip 62 is dissipated to the barrel 12 through the substrate 64, the body portion 70 and the attachment portion 72. The present embodiment is advantageous in improving the heat dissipation property of the imaging element chip 62 because the substrate 64 and the body portion 70 are made of a ceramic material and the attachment portion member 72 is made of a metal material. Accordingly, the present embodiment is advantageous in preventing the temperature of the imaging element chip 62 from rising, improving the stability of operation of the imaging element chip 62, and extending the lifetime thereof.

While in the present embodiment the digital still camera is exemplified as the image capturing apparatus, the present invention obviously can be applied to various image capturing apparatuses, such as a video camera and a television camera.

The present application contains subject matter related to Japanese Patent Applications No. 2007-045533 and No. 2007-314724 filed in the Japanese Patent Office on Feb. 26, 2007 and Dec. 5, 2007, respectively, the entire contents of which are incorporated herein by reference.

What is claimed is:

1. An imaging element package comprising:
an imaging element chip having an imaging surface;
a substrate on which the imaging element chip mounted;
an optical member that allows light to pass; and
a supporting body having a body portion where a through-opening serving as a light path for imaging is formed, and an attachment portion that is provided in the body portion and is to be attached to an attachment position,
wherein the substrate is attached to the body portion so as to close one end of the opening in a through direction in a state where the imaging surface faces another end from the one end of the opening in the through direction, and
the optical member is attached to the body portion so as to close the other end of the opening in the through direction,
wherein an inner side portion of the body portion forming the opening is formed with an inclined surface such that a cross section of the opening gradually becomes smaller from the one end to the other end in the through direction.

2. The imaging element package according to claim 1, wherein the attachment of the body portion and the substrate is performed by adhesion with an adhesive.

3. The imaging element package according to claim 1, wherein the attachment of the body portion and the optical member is performed by adhesion with an adhesive.

4. The imaging element package according to claim 1, wherein the substrate is formed of a material having sufficient heat resistance for reflow soldering.

5. The imaging element package according to claim 1, wherein the substrate is made of a ceramic substrate.

6. The imaging element package according to claim 1, wherein the optical member is a cover glass, an optical filter or a lens.

7. The imaging element package according to claim 1, wherein the optical member includes a cover glass and a coat layer, the coat layer having an optical filtering function and being provided on a surface of the cover glass.

8. The imaging element package according to claim 1, wherein the supporting body is formed of a material having sufficient heat resistance for reflow soldering.

9. The imaging element package according to claim 1, wherein the supporting body is formed of an injection-molding epoxy resin.

10. The imaging element package according to claim 1, wherein the body portion includes a body portion member made of a ceramic material,
the attachment portion includes an attachment portion member made of a metal material, and
the supporting body is formed by assembling and integrating the body portion member and the attachment portion member.

11. The imaging element package according to claim 10, wherein the body portion member has a rectangular tubular shape, an inner space of the body portion member being the opening,
the attachment portion member has rectangular plate shape with larger dimension than the body portion member, and is provided with an insertion hole, into which the body portion member is inserted, the insertion hole being bored through at a center of the attachment portion member in a thickness direction of the attachment portion member and orthogonal to the through direction of the opening, and
the integration of the body portion member and the attachment portion member is performed by joining an outer circumference surface of the body portion member and part of the attachment portion member that faces the outer circumference surface by means of glass welding, while the body portion member is being inserted into the insertion hole.

12. The imaging element package according to claim 11, wherein the attachment portion member has a first surface and a second surface disposed on both ends of a thickness-wise direction, the first surface being positioned at part of the body portion member on which the substrate is disposed, the second surface being positioned at part of the body portion member on which an optical member is disposed,
a positioning portion is formed on an outer circumference surface of the body portion member, and
the positioning portion is structured such that the body portion member comes into contact with the second surface of the attachment portion member when the body portion member is inserted into the insertion hole, thereby performing the positioning of the body portion member against the attachment portion member in the through direction of the insertion hole.

13. An imaging element package comprising:
an imaging element chip having an imaging surface;
a substrate on which the imaging element chip mounted;
an optical member that allows light to pass; and
a supporting body having a body portion where a through-opening serving as a light path for imaging is formed, and an attachment portion that is provided in the body portion and is to be attached to an attachment position,
wherein the substrate is attached to the body portion so as to close one end of the opening in a through direction in a state where the imaging surface faces an other end from the one end of the opening in the through direction, and
the optical member is attached to the body portion so as to close the other end of the opening in the through direction,
wherein a center axis that passes a center of the imaging surface and is perpendicular to the imaging surface, and an axis of the opening coincide each other, and
an inner side portion of the body portion forming the opening is formed with an inclined surface that gradually shifts away from the center axis of the imaging element as it comes close to the imaging element.

14. An imaging element package comprising:
an imaging element chip having an imaging surface;
a substrate on which the imaging element chip mounted;
an optical member that allows light to pass; and
a supporting body having a body portion where a through-opening serving as a light path for imaging is formed, and an attachment portion that is provided in the body portion and is to be attached to an attachment position,
wherein the substrate is attached to the body portion so as to close one end of the opening in a through direction in a state where the imaging surface faces an other end from the one end of the opening in the through direction, and
the optical member is attached to the body portion so as to close the other end of the opening in the through direction,
wherein the attachment portion has a plate shape expanding in a direction perpendicular to the through direction of the opening, and in the attachment portion, a screw insertion hole extending in a direction parallel to the through direction of the opening is formed.

15. The imaging element package according to claim 14, wherein
in the attachment portion, a positioning hole extending in the direction parallel to the through direction of the opening is formed, and
a positioning surface extending on a surface perpendicular to the through direction of the opening is formed in a position of the attachment portion closer to the other end of the opening in the through direction.

16. The imaging element package according to claim 1, wherein the attachment of the body portion and the optical member is performed by adhesion with an adhesive, and in an end portion of the inclined surface closer to the other end, a depressed portion that becomes wider in a direction perpendicular to the through direction of the opening is formed, the depressed portion collecting superfluous part of the adhesive, which does not contribute to the adhesion of the optical member.

17. The imaging element package according to claim 13, wherein the attachment of the body portion and the optical member is performed by adhesion with an adhesive, and in an end portion of the inclined surface closer to the other end, a depressed portion that becomes wider in a direction perpendicular to the through direction of the opening is formed, the depressed portion collecting the superfluous part of the adhesive, which does not contribute to the adhesion of the optical member.

18. An imaging element module including an imaging element package and a wiring member, the imaging element package comprising:

an imaging element chip having an imaging surface;

a substrate with the imaging element chip mounted thereon;

an optical member that allows light to pass;

a supporting body having a body portion where a through-opening serving as a light path for imaging is formed, and an attachment portion that is provided in the body portion for attachment in an attachment position, wherein the substrate is attached to the body portion so as to close one end of the opening in a through direction in a state where the imaging surface faces another end from the one end of the opening in the through direction, the optical member is attached to the body portion so as to close the other end of the opening in the through direction, and the substrate is electrically connected to the wiring member, wherein an inner side portion of the body portion forming the opening is formed with an inclined surface such that a cross section of the opening gradually becomes smaller from the one end to the other end in the through direction.

19. A lens barrel including a barrel and an imaging element module, the imaging element module including an imaging element package and a wiring member, the imaging element package comprising:

an imaging element chip having an imaging surface;

a substrate with the imaging element chip mounted thereon;

an optical member that allows light to pass; and a supporting body having a body portion where a through-opening serving as a light path for imaging is formed, and an attachment portion provided in the body portion, wherein the substrate is attached to the body portion so as to close one end of the opening in a through direction in a state where the imaging surface faces another end from the one end of the opening in the through direction, the optical member is attached to the body portion so as to close the other end of the opening in the through direction, the substrate is electrically connected to the wiring member, and the attachment portion is attached to the barrel such that the optical member faces an inside of the barrel, wherein an inner side portion of the body portion forming the opening is formed with an inclined surface such that a cross section of the opening gradually becomes smaller from the one end to the other end in the through direction.

20. An image capturing apparatus having a lens barrel, the lens barrel having a barrel and an imaging element module, the imaging element module including an imaging element package and a wiring member, the imaging element package comprising:

an imaging element chip having an imaging surface;

a substrate with the imaging element chip mounted thereon;

an optical member that allows light to pass; and a supporting body having a body portion where a through-opening serving as a light path for imaging is formed, and an attachment portion provided in the body portion, wherein the substrate is attached to the body portion so as to close one end of the opening in a through direction in a state where the imaging surface faces another end from the one end of the opening in the through direction, the optical member is attached to the body portion so as to close the other end of the opening in the through direction, the substrate is electrically connected to the wiring member, and the attachment portion is attached to the barrel such that the optical member faces an inside of the barrel, wherein an inner side portion of the body portion forming the opening is formed with an inclined surface such that a cross section of the opening gradually becomes smaller from the one end to the other end in the through direction.

* * * * *